(12) United States Patent
Singh et al.

(10) Patent No.: US 12,014,740 B2
(45) Date of Patent: Jun. 18, 2024

(54) SYSTEMS AND METHODS FOR CONTACTLESS AUTHENTICATION USING VOICE RECOGNITION

(71) Applicant: Fidelity Information Services, LLC, Jacksonville, FL (US)

(72) Inventors: Raghavendra Pratap Singh, Bangalore (IN); Vijayendra Virendra Mishra, Bangalore (IN)

(73) Assignee: FIDELITY INFORMATION SERVICES, LLC, Jacksonville, FL (US)

( * ) Notice: Subject to any disclaimer, the term of this patent is extended or adjusted under 35 U.S.C. 154(b) by 106 days.

(21) Appl. No.: 16/820,010

(22) Filed: Mar. 16, 2020

(65) Prior Publication Data
US 2021/0287681 A1    Sep. 16, 2021

Related U.S. Application Data

(63) Continuation of application No. 16/242,672, filed on Jan. 8, 2019.

(51) Int. Cl.
*G10L 17/04* (2013.01)
*G06F 21/32* (2013.01)
(Continued)

(52) U.S. Cl.
CPC ............. *G10L 17/04* (2013.01); *G06F 21/32* (2013.01); *G06N 3/045* (2023.01); *G10L 17/18* (2013.01); *G10L 17/22* (2013.01); *H04L 63/0861* (2013.01)

(58) Field of Classification Search
CPC ......... G10L 17/04; G10L 17/18; G10L 17/22; G06F 21/32; G06N 3/0454; G06N 5/003; G06N 20/00; G06N 3/082; H04L 63/0861
See application file for complete search history.

(56) References Cited

U.S. PATENT DOCUMENTS

| 6,853,716 B1 | 2/2005 | Shaffer et al. |
| 8,014,496 B2 | 9/2011 | Schultz |
(Continued)

FOREIGN PATENT DOCUMENTS

| CN | 101141246 A | 3/2008 |
| CN | 104464735 A | 3/2015 |
(Continued)

OTHER PUBLICATIONS

Audio-visual speech recognition using deep learning by Kuniaki Noda; Yuki Yamaguchi; Kazuhiro Nakadai; Hiroshi G. Okuno and Tetsuya Ogata pp. 16; Published online: Dec. 20, 2014.
(Continued)

*Primary Examiner* — Linda Wong
(74) *Attorney, Agent, or Firm* — FINNEGAN, HENDERSON, FARABOW, GARRETT & DUNNER, LLP

(57) ABSTRACT

Systems and methods for contactless authorization using voice recognition is disclosed. The system may include one or more memory units storing instructions and one or more processors configured to execute the instructions to perform operations. The operations may include receiving user data comprising a user identifier, an audio data having a first data format, and a client device identifier. The operations may include generating a processed audio data based on the received audio data. The processed audio data may have a second data format. The operations may include transmitting, to a speech module, the processed audio data. The operations may include receiving from the speech module, a voice match result. In some embodiments, the operations include authenticating a user based on the voice match result and transmitting, to a client device associated with the client device identifier, a client notification comprising a result of the authentication.

20 Claims, 13 Drawing Sheets

(51) Int. Cl.
*G06N 3/045* (2023.01)
*G10L 17/18* (2013.01)
*G10L 17/22* (2013.01)
*H04L 9/40* (2022.01)

(56) References Cited

U.S. PATENT DOCUMENTS

| | | | |
|---|---|---|---|
| 8,892,233 B1 | 11/2014 | Lin et al. | |
| 9,774,998 B1 | 9/2017 | Soyannwo et al. | |
| 10,063,542 B1 | 8/2018 | Kao | |
| 10,468,019 B1 | 11/2019 | Pemba et al. | |
| 10,515,637 B1* | 12/2019 | Devries | G10L 15/1822 |
| 10,706,848 B1 | 7/2020 | Greene et al. | |
| 10,854,206 B1 | 12/2020 | Liu et al. | |
| 2003/0157968 A1 | 8/2003 | Boman et al. | |
| 2004/0243412 A1 | 12/2004 | Gupta et al. | |
| 2006/0156052 A1 | 7/2006 | Bodnar et al. | |
| 2007/0185718 A1 | 8/2007 | Di Mambro et al. | |
| 2011/0099019 A1 | 4/2011 | Zopf | |
| 2011/0099108 A1 | 4/2011 | Fung et al. | |
| 2012/0252411 A1 | 10/2012 | Johnsgard et al. | |
| 2012/0316876 A1 | 12/2012 | Jang et al. | |
| 2013/0097682 A1 | 4/2013 | Zeljkovic et al. | |
| 2013/0179167 A1* | 7/2013 | Edgington | G10L 13/033 704/246 |
| 2013/0290415 A1 | 10/2013 | Ho et al. | |
| 2014/0114661 A1 | 4/2014 | Mengibar et al. | |
| 2014/0172430 A1 | 6/2014 | Rutherford et al. | |
| 2015/0056952 A1 | 2/2015 | Mintz et al. | |
| 2015/0120294 A1 | 4/2015 | Gardner et al. | |
| 2015/0142438 A1* | 5/2015 | Dai | G10L 17/04 704/275 |
| 2015/0193776 A1 | 7/2015 | Douglas et al. | |
| 2015/0304325 A1 | 10/2015 | Winter et al. | |
| 2016/0155633 A1* | 6/2016 | Zhou | C08J 3/24 257/632 |
| 2016/0234204 A1 | 8/2016 | Rishi et al. | |
| 2016/0253669 A1 | 9/2016 | Yoon et al. | |
| 2017/0270965 A1* | 9/2017 | Bao | G06F 16/35 |
| 2017/0308401 A1* | 10/2017 | Argenti | G06F 9/5027 |
| 2017/0365259 A1 | 12/2017 | Zheng et al. | |
| 2018/0027414 A1 | 1/2018 | Li et al. | |
| 2018/0047394 A1 | 2/2018 | Tian et al. | |
| 2018/0144742 A1* | 5/2018 | Ye | G10L 15/02 |
| 2018/0205726 A1 | 7/2018 | Chari et al. | |
| 2018/0226079 A1* | 8/2018 | Khoury | G10L 17/04 |
| 2018/0232723 A1 | 8/2018 | Lin et al. | |
| 2018/0277124 A1* | 9/2018 | Moreno | G10L 17/14 |
| 2018/0366128 A1 | 12/2018 | Liu et al. | |
| 2019/0027138 A1* | 1/2019 | Wang | G10L 15/22 |
| 2019/0075453 A1 | 3/2019 | Yoon et al. | |
| 2019/0318724 A1 | 10/2019 | Chao et al. | |
| 2019/0318735 A1 | 10/2019 | Chao | |
| 2019/0371300 A1* | 12/2019 | Park | G06F 16/64 |
| 2020/0012657 A1 | 1/2020 | Walters et al. | |
| 2020/0012662 A1 | 1/2020 | Walters et al. | |
| 2020/0012886 A1 | 1/2020 | Walters et al. | |
| 2020/0012900 A1 | 1/2020 | Walters et al. | |
| 2020/0012902 A1 | 1/2020 | Walters et al. | |
| 2020/0012937 A1 | 1/2020 | Walters et al. | |
| 2020/0013037 A1* | 1/2020 | Benkreira | G06Q 20/405 |
| 2020/0097980 A1* | 3/2020 | Teo | H04L 67/306 |
| 2020/0175961 A1 | 6/2020 | Thomson et al. | |
| 2020/0279552 A1* | 9/2020 | Piersol | G10L 17/22 |
| 2020/0310598 A1* | 10/2020 | Colevas | G06N 20/00 |
| 2021/0074295 A1 | 3/2021 | Moreno et al. | |
| 2021/0142177 A1* | 5/2021 | Mallya | G06N 3/0454 |
| 2021/0203650 A1 | 7/2021 | Becker et al. | |
| 2021/0248487 A1* | 8/2021 | Zheng | G06N 5/027 |
| 2021/0327407 A1* | 10/2021 | Chae | G10L 25/30 |

FOREIGN PATENT DOCUMENTS

| | | | | |
|---|---|---|---|---|
| CN | 103198830 A | | 2/2016 | |
| CN | 106356054 A | | 1/2017 | |
| CN | 109147779 A | * | 1/2019 | G10L 15/063 |
| CN | 109923885 A | | 6/2019 | |
| CN | 110914822 A | | 3/2020 | |
| CN | 111445904 A | | 7/2020 | |
| JP | 2012039166 A | | 2/2012 | |
| JP | 2018025855 A | | 2/2018 | |
| KR | 20160026138 A | | 3/2016 | |
| WO | WO 2010075623 A1 | | 7/2010 | |
| WO | WO 2017200946 A1 | | 11/2017 | |
| WO | WO 2018/087764 A1 | | 5/2018 | |

OTHER PUBLICATIONS

Multitask Learning of Deep Neural Networks for Low-Resource Speech Recognition by Dongpeng Chen and Brian Kan-Wing Mak p. 12; Published on IEEE Jul. 2015.

Automatic Speech Recognition Technique for Voice Command by Anshul Gupta, Nileshkumar Patel and Shabana Khan p. 5; IEEE (Year: 2014).

Speech Recognition Using Artificial Neural Networks by Chee Peng Lim, Siew Chan Woo, Aun Sim Loh, and Rohaizan Osman pp. 5; IEEE (Year: 2000).

Deep Neural Networks for Acoustic Modeling in Speech Recognition by Geoffrey Hinton, Li Deng, Dong Yu, George E. Dahl, Abdel-rahman Mohamed, Navdeep Jaitly, Andrew Senior, Vincent Vanhoucke, Patrick Nguyen, Tara N. Sainath, and Brian Kingsbury pp. 16; IEEE Signal Processing Magzine [82] Nov. 2012.

"Biometric Authentication in Payments", Promontory Financial Group, Nov. 2017, 42 pages.

Extended European Search Report for European Patent No. 19908596.0 dated Nov. 28, 2022 (7 pages).

International Search Report and Written Opinion for International Application PCT/US2019/068687, mailed Mar. 19, 2020 (10 pages).

First Examination Report for Indian Patent Application No. 202117034324 dated Jan. 27, 2023.

First Office Action in Chinese Application No. 201980092076.2, and English translation thereof mailed Jul. 25, 2023 (12 pages).

* cited by examiner

SYSTEMS AND METHODS FOR CONTACTLESS AUTHENTICATION USING VOICE RECOGNITION

This application is a continuation of application Ser. No. 16/242,672, filed Jan. 8, 2019, which is incorporated herein by reference.

BACKGROUND

Conventional authentication systems and methods often require contact with a device. For example, a user may be required to manually enter authentication data into a user device (i.e., contact the device) to authorize a download, authorize an account login, authorize an internet-based purchase, authorize an in-person transaction, open an access point (pass a security checkpoint, enter a restricted space within a building, enter a parking facility), attend an event, start a vehicle, board a plane or other means of transportation, or the like. The authentication data may include a PIN, password, fingerprint, tap code, or other authentication data. The user device may be a smart phone, a personal computer, a tablet, a wearable device, a smart watch, electronic glasses, or another user device.

Conventional authentication systems and methods may rely on authentication data from a dedicated authentication device, such as a card with a magnetic strip, a card with a chip, a key device, a fob, or the like. An authentication process may involve physically manipulating the device by, for example, swiping, scanning, or otherwise moving the authentication device near a sensor.

These conventional authentication systems and methods suffer from deficiencies in part because they rely on contact with a device such as manually entering authentication data or physically manipulating a dedicated authentication device, which may be slow and inefficient. Users may need to remember one or more authentication inputs. Carrying multiple dedicated authentication devices may be inconvenient. If a user forgets an authentication input or forgets to carry an authentication device, the user may be unable to complete an authentication process at the desired time.

Further, conventional systems are prone to security risks because a malicious actor can steal authentication data or a dedicated authentication device and use the stolen data or device. In such cases, the authentication system may be unable to distinguish the malicious actor from a true authorized user.

In addition, many conventional systems do not employ advanced authentication methods such as facial recognition, voice recognition, or the like. Conventional systems may lack the computational power or bandwidth to perform advanced authentication methods. As a result, conventional systems may be unable to quickly and efficiently process advanced authentication methods. Further, data for advanced authentication methods may present additional security challenges because these data can be highly personal (e.g., voice and facial recognition data), and therefore the use of such data calls for extra security precautions that may be expensive or unavailable for conventional systems.

In addition, users may need to perform authentications on different types of devices, each of which may have different software and hardware systems (i.e., different platforms). These devices may involve systems made by one or more companies, each of which implement similar technology in different ways. This variety places a burden on authentication systems to receive data in a variety of formats and connect to devices using a variety of communication protocols.

Further, an authentication process may require interactions between a user device or dedicated authentication device and a third-party authentication device (e.g., a client device). The supply of third-party authentication devices may be limited or prohibitively expensive in some regions or markets. Some conventional devices may require specialized training that adds costs and makes the use of devices inconvenient. Some devices may be difficult or impossible to use for users with disabilities. For example, users with learning disabilities or visual impairments may experience difficulty using devices with touch screens. In addition, software and hardware system components of the third-party device (i.e., the platform) may not be compatible with software and hardware system components (platform) of a user device. For example, to authenticate a transaction, a user may need to engage with a point of sale device configured to receive data from a credit card and one type of smartphone, but which is not configured to receive data from another type of smartphone. Back-end authentication systems may require data in specific formats compatible with one platform but not with native formats of devices. These limitations make it difficult to design universal solutions as devices standards change and as new devices become available.

Some solutions to the problems of conventional systems have been proposed. For example, some systems employ third-party authentication devices configured to connect to user devices using near field technology and engage in authentication protocols. However, many of these systems require contact (e.g., manual entry of authentication data and/or physically moving a user device close to a scanner). Further, as pointed out above, these systems may be unavailable or expensive, do not perform advanced authentication processes, and are compatible with only a limited number of devices running on a limited number of platforms.

Therefore, in view of the shortcomings and problems with existing methods, there is a need for improved systems and methods that employ contactless authentication that can be used for many different types of devices. Such unconventional systems will improve security, improve convenience, decrease cost, and increase cross-platform flexibility.

SUMMARY

The disclosed embodiments provide systems and methods for contactless authorization using voice recognition compatible with multiple platforms. The unconventional disclosed embodiments provide enhancements to conventional systems that require contact (manual entry of authentication data, physical manipulation of a device, or other contact) and improve on conventional systems limited to specific platforms or that require specific third-party authentication devices. The disclosed systems and methods may be performed using a wide variety of user devices and client devices either because the system authentication can be performed by remote components (e.g., servers, cloud servers) or copies of speech models stored on local devices. The disclosed systems and methods are implemented using a combination of conventional hardware and software as well as specialized hardware and software, such as a machine constructed and/or programmed specifically for performing functions associated with the disclosed method steps.

In some embodiments, aspects of the disclosed systems and methods may be implemented on one or more cloud services designed to generate (spin-up) ephemeral container instances in response to event triggers, assign one or more tasks to the container instances, and terminate (spin-down) the container instances upon completion of a task. By implementing methods using such cloud services, disclosed systems efficiently provision and resources based on demand and provide security advantages because the ephemeral container instances may be closed and destroyed upon completion of a task. That is, the container instances prevent attempts to access the container and do not permit access from outside using terminals or remote shell tools like SSH, RTP, FTP, or Curl, for example. Further, terminating container instances may include destroying data, thereby protecting sensitive data. Destroying data can provide security advantages because it may involve permanently deleting data (e.g., overwriting data) and associated file pointers.

Consistent with the present embodiments, a system for contactless authorization using voice recognition is disclosed. The system may include one or more memory units storing instructions and one or more processors configured to execute the instructions to perform operations. The operations may include receiving user data comprising a user identifier, an audio data having a first data format, and a client device identifier. The operations may include generating, by the communication module, a processed audio data based on the received audio data. The processed audio data may have a second data format. The operations may include transmitting, by the communication module, to a speech module, the processed audio data. The operations may include receiving, at the communication module, from the speech module, a voice match result. In some embodiments, the operations include authenticating a user based on the voice match result and transmitting, to a client device associated with the client device identifier, a client notification comprising a result of the authentication.

Consistent with the present embodiments, a method for contactless authorization using voice recognition is disclosed. The method may include receiving user data comprising a user identifier, an audio data having a first data format, and a client device identifier. The method may include generating, by the communication module, a processed audio data based on the received audio data. The processed audio data may have a second data format. The method may include transmitting, by the communication module, to a speech module, the processed audio data. The method may include receiving, at the communication module, from the speech module, a voice match result. In some embodiments, the method includes authenticating a user based on the voice match result and transmitting, to a client device associated with the client device identifier, a client notification comprising a result of the authentication.

Consistent with other disclosed embodiments, non-transitory computer readable storage media may store program instructions, which are executed by at least one processor and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION OF THE EMBODIMENTS

Disclosed embodiments include systems and methods for contactless authentication using voice recognition to improve upon the security, convenience, and cross-platform compatibility of conventional authentication process. The authentication may be performed to authorize a download, authorize an account login, authorize an internet-based purchase, authorize an in-person transaction, pass an access point, attend an event, start a vehicle, board a plane or other means of transportation, or the like.

Reference will now be made in detail to exemplary embodiments, examples of which are illustrated in the accompanying drawings and disclosed herein. Wherever convenient, the same reference numbers will be used throughout the drawings to refer to the same or like parts.

Figure 1:
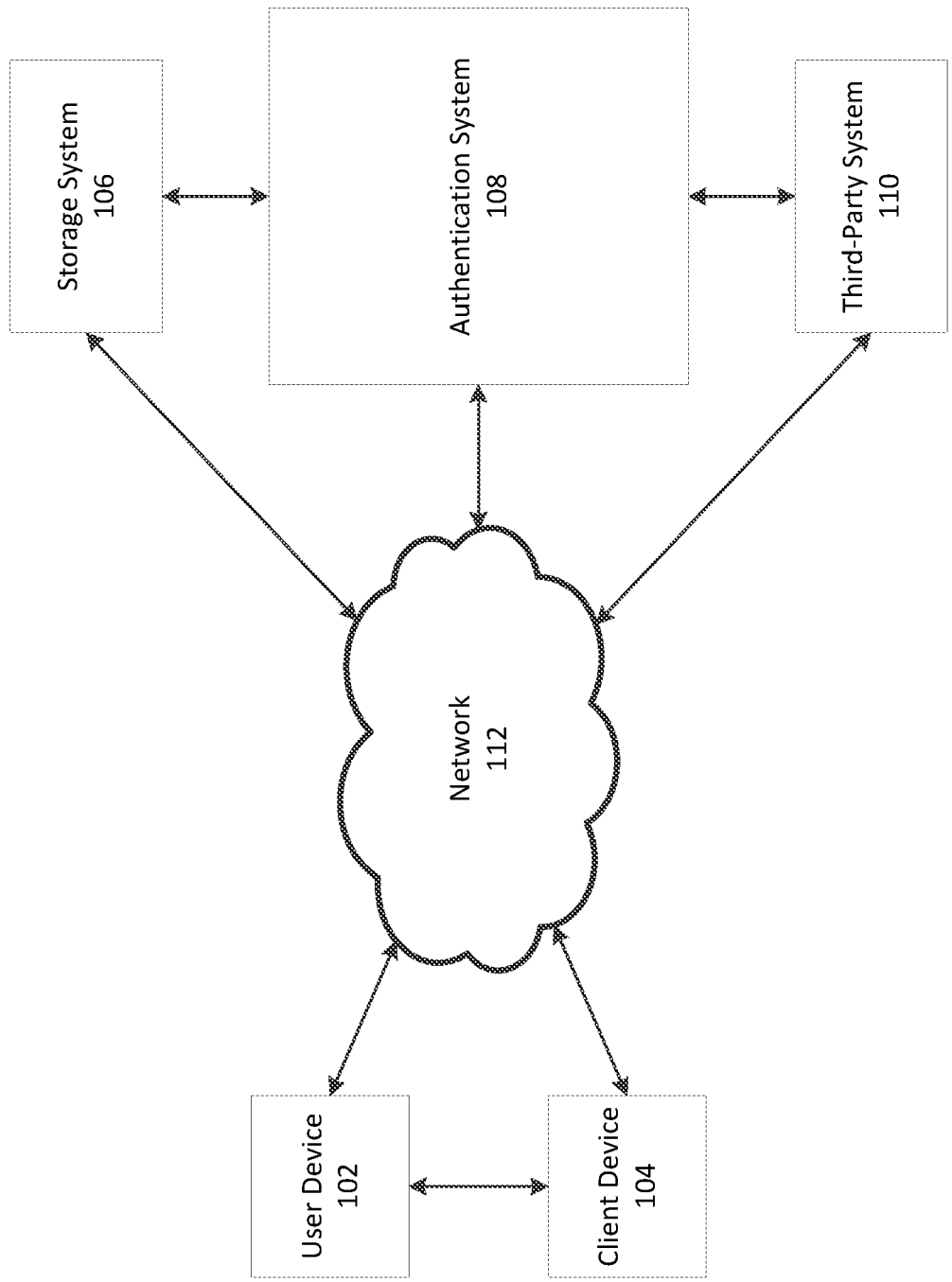
FIG. 1 is a diagram of an exemplary system for contactless authorization, consistent with disclosed embodiments.

FIG. 1 is a diagram of exemplary system 100 for contactless authorization, consistent with disclosed embodiments. System 100 may include a user device 102, a client device 104, a storage system 106, an authentication system 108, and a third-party system 110. Components of system 100 may be connected to each other through a network 112. As shown in FIG. 1, user device 104 may be directly connected to vehicle system 102. Authentication system 108 may be directly connected to storage system 106 and/or third-party system 110.

As will be appreciated by one skilled in the art, the components of system 100 can be arranged in various ways and implemented with any suitable combination of hardware, firmware, and/or software, as applicable. For example, as compared to the depiction in FIG. 1, system 100 may include a larger or smaller number of user devices, client devices, storage systems, authentication systems, third-party systems, or networks. In addition, system 100 may further include other components or devices not depicted that perform or assist in the performance of one or more processes, consistent with the disclosed embodiments. The exemplary components and arrangements shown in FIG. 1 are not intended to limit the disclosed embodiments.

Referring to FIG. 1, user device 102 may be a mobile device, such as a smartphone, a tablet, a personal computer, a card device, a wearable fitness tracker, a key device, electronic glasses, any device configured to execute instructions spoken by human users, a specialized device configured to perform methods according to disclosed embodiments, or the like. User device 102 includes one or more memory units and one or more processors configured to perform operations consistent with disclosed embodiments. User device 102 be connected to network 112 and may additionally be connected to client device 104. An exemplary embodiment of user device 102 is described below in greater detail with respect to FIG. 2.

System 100 may include client device 104. Client device 104 may be a terminal, a kiosk, a sensor, a security system component, a computer, a mobile device, a tablet, a smart watch, a wearable, a transaction device, a point of sale device, an Automated Teller Machine, a personal electronic assistant (e.g., ALEXA by AMAZON, GOOGLE HOME, SIRI by APPLE, MICROSOFT CORTANA), a robotic device, any device configured to execute instructions spoken by human users, or other device. Client device 102 includes one or more memory units and one or more processors configured to perform operations consistent with disclosed embodiments. Client device 102 be connected to network 112 and may additionally be connected to user device 102. An exemplary embodiment of client device 102 is described below in greater detail.

Storage system 106, shown in FIG. 1, includes one or more memory units and one or more processors configured to perform operations consistent with disclosed embodiments. In some embodiments, storage system 106 may include hardware, software, and/or firmware modules. In some embodiments, some or all components of storage system 106 may be installed in a single device, such as a user device or a client device. In some embodiments, some or all components of storage system 106 may be hosted on a device, a computer, a server, a cluster of servers, or a cloud service (e.g., GOOGLE FIREBASE, AMAZON S3, GOOGLE CLOUD SPANNER, ORACLE CLOUD STORAGE CLASSIC, MICROSOFT AZURE BLOB STORAGE, IBM CLOUD OBJECT STORAGE, VMWARE, SAP CLOUD PLATFORM, a personal cloud, or the like). In some embodiments not shown, storage system 106 may be a component of authentication system 108. Storage system 106 may be connected to network 112 and may additionally be connected to authentication system 108. Storage system 106 is described in greater detail below.

Still referring to FIG. 1, authentication system 108 includes one or more memory units and one or more processors configured to perform operations consistent with disclosed embodiments. In some embodiments, authentication system 108 may include hardware, software, and/or firmware modules. In some embodiments, some or all components of authentication system 108 may be installed in a single device, such as a user device or a client device. In some embodiments, some or all components of authentication system 108 may be hosted on one or more servers, one or more cluster of servers, or one or more cloud services (e.g., MICROSOFT AZURE, AMAZON AWS LAMBDA, MICROSOFT COGNITIVE SERVICES, ORACLE CLOUD, GOOGLE CLOUD FUNCTIONS, APACHE OPENWHISK, or the like). Authentication system 108 may be connected to network 112 and may additionally be connected to storage system 106 and/or third-party system 110. Authentication system 108 is described in greater detail below.

System 100 may include third-party system 110. Third-party system 110 one or more memory units and one or more processors configured to perform operations consistent with disclosed embodiments. In some embodiments, authentication system 108 may include hardware, software, and/or firmware modules. Third-party system 110 may include one or more of a healthcare system, a security system, a financial system, a transaction system, a credit card system, a government system, a voting system, a parking access system, a building access system, or other system, consistent with disclosed embodiments. Third-party system 110 may be connected to network 112 and may additionally be connected to authentication system 108.

As shown in FIG. 1, at least one of user device 102, client device 104, storage system 106, authentication system 108, or third-party system 110 may connect to network 112. Network 112 may be a public network or private network and may include, for example, a wired or wireless network, including, without limitation, a Local Area Network, a Wide Area Network, a Metropolitan Area Network, an IEEE 802.11 wireless network (e.g., "Wi-Fi"), a network of networks (e.g., the Internet), a land-line telephone network, or the like. In some embodiments, network 112 may be a secure network and require a password or other authentication criterion to access the network.

Figure 2:
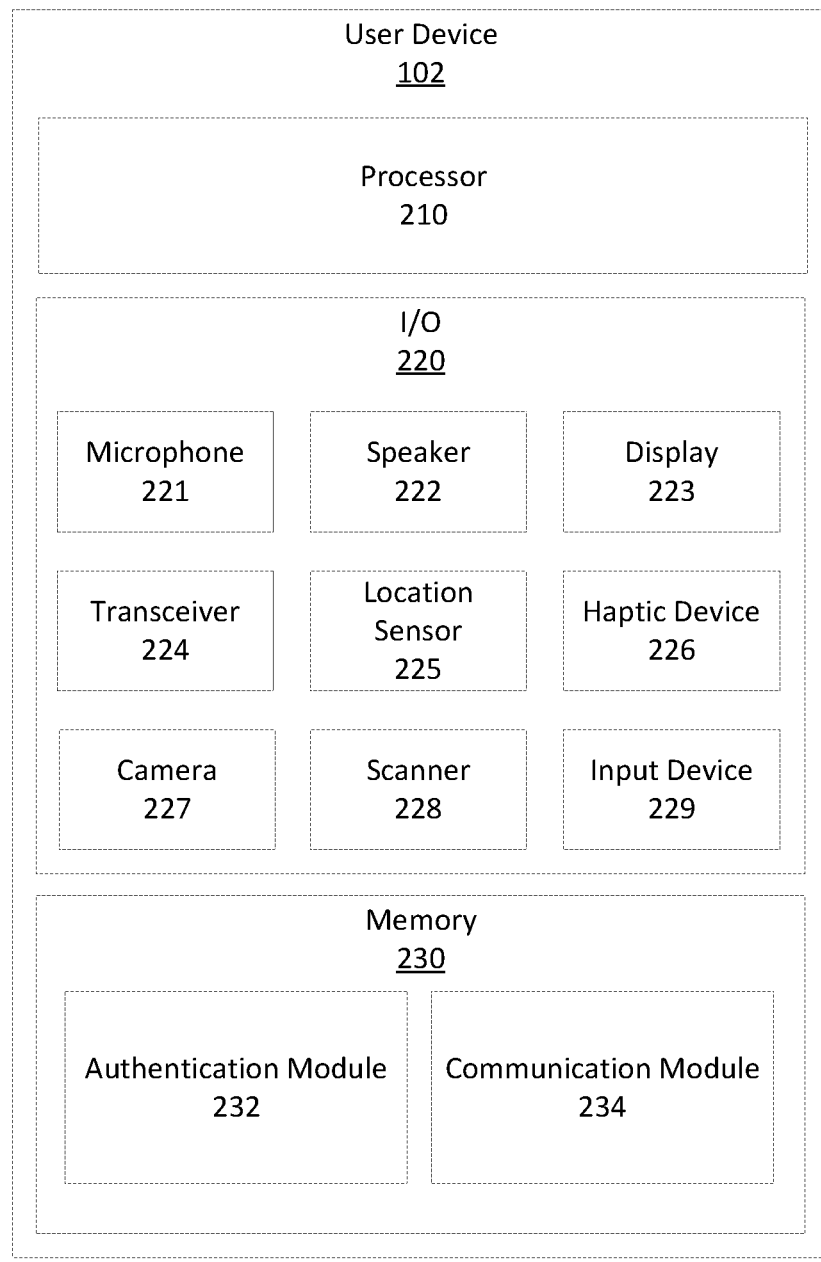
FIG. 2 is a diagram of an exemplary user device, consistent with disclosed embodiments.

FIG. 2 is a diagram of exemplary user device 102, consistent with disclosed embodiments. User device 102 may be a mobile device, such as a smartphone, a tablet, a personal computer, a card device, a wearable fitness tracker, a key device, electronic glasses, any device configured to execute instructions spoken by human users, a specialized device configured to perform methods according to disclosed embodiments, or the like.

As depicted in FIG. 2, user device 102 may include one or more processors 210, input/output units (I/O devices) 220, and one or more memory units 230. FIG. 2 is an exemplary configuration of user device 102. As will be appreciated by one skilled in the art, the components and arrangement of components included in user device 102 may vary. For example, as compared to the depiction in FIG. 2, user device 102 may include a larger or smaller number of processors 210, I/O devices 220, or memory units 230. In addition, user device 102 may further include other components or devices not depicted that perform or assist in the performance of one or more processes consistent with the disclosed embodiments. The components and arrangements shown in FIG. 2 are not intended to limit the disclosed embodiments, as the components used to implement the disclosed processes and features may vary.

Processors 210 may be known computing processors, including a microprocessor from the SNAPDRAGON family manufactured by QUALCOMM, the EXYNOS family manufactured by SAMSUNG, or any of various processors manufactured by APPLE, TEXAS INSTRUMENTS (TI), HEWLETT PACKARD, NVIDIA, QUALCOMM, SAMSUNG, PANASONIC, or LG, for example. Processor 210 may constitute a single-core or multiple-core processor that executes parallel processes simultaneously. For example, processor 210 may be a single-core processor configured with virtual processing technologies. In certain embodiments, processor 210 may use logical processors to simultaneously execute and control multiple processes. Processor 210 may implement virtual machine technologies, or other known technologies to provide the ability to execute, control, run, manipulate, store, etc., multiple software processes, applications, programs, etc. In another embodiment, processor 210 may include a multiple-core processor arrangement (e.g., dual core, quad core, etc.) configured to provide parallel processing functionalities to allow execution of multiple processes simultaneously. One of ordinary skill in the art would understand that other types of processor arrangements could be implemented that provide for the capabilities disclosed herein. The disclosed embodiments are not limited to any type of processor(s) 210. Processor 210 may execute various instructions stored in memory 230 to perform various functions of the disclosed embodiments described in greater detail below. Processor 210 is configured to execute functions written in one or more known programming languages.

Referring again to FIG. 2, I/O devices 220 may include a microphone 221, a speaker 222, a display 223, a transceiver 224, a location sensor 225, a haptic device 226, a camera 227, a scanner 228, and/or an input device 229. I/O devices 220 may include other I/O devices, not depicted, that perform or assist in the performance of one or more processes consistent with disclosed embodiments. In some embodiments, some or all of I/O devices 220 may be mounted to user device 102. In some embodiments, some or all of I/O devices 220 may be components of stand-alone devices communicatively coupled to user device 102.

As shown in FIG. 2, I/O devices 220 may include microphone 221, configured to receive an audio signal. In some embodiments, microphone 221 includes a microphone array. Microphone 221 may be mounted to user device 102 or may be communicatively coupled to user device 102 (e.g., a wired headset, wireless microphone, or the like).

In some embodiments, user device 102 includes one or more speakers 222 configured to provide audio output. In some embodiments, speaker 222 includes an array of speakers. Speaker 222 may be mounted in or on user device 102, or may be a component of a standalone device communicatively coupled to user device 102 (e.g., a wired speaker, a wireless speaker, or the like).

I/O devices 220 may further include display 223. Display 223 may include a light-emitting component, such as a light emitting diode (LED) or other component capable of providing a visible signal to a user. In some embodiments, display 223 includes at least one of a monitor, an LCD display, an LED display, a touch screen, a lamp, a projector, or another visual display.

As shown, I/O devices 220 may include transceiver 224. Transceiver 224 may include a transceiver configured to connect with at least one of any type of cellular data network, or at least one of a Wi-Fi transceiver, a Li-Fi transceiver, Near Field Communication (NFC) transceiver, a radio transceiver, an ultra-high frequency (UHF) transceiver, a Bluetooth transceiver, an infrared transceiver, or other wireless transceiver.

In some embodiments, user device 102 includes location sensor 225. Location sensor 225 may include at least one of a global positioning system (GPS) sensor, a magnetometer, or an accelerometer. Location sensor 225 may be a component of user device 102 or may be a standalone device communicatively coupled to user device 102.

I/O devices 220 may include a haptic (i.e. tactile) device 226 configured to receive a user instruction signal and provide haptic feedback. In some embodiments, the intensity, duration, and pattern of the haptic feedback is based on the user instruction signal. In some embodiments, displaying or playing a notification includes providing haptic feedback.

I/O devices 220 may include camera 227. Camera 227 may include a video camera, a still-image camera configured to take photographs. Camera 227 may include a lens and a digital imaging device such as a charge couple device (CCD) sensor. Camera 227 may be a component of user device 102 or may be a standalone device communicatively coupled to user device 102.

As shown in FIG. 2, I/O devices 220 may include scanner 228. Scanner 228 may be a 3D image scanner, a laser scanner, a bar code scanner, or other scanner. In embodiments some embodiment, scanner 228 includes a 3D scanner adapted to transmit and receive light signals for the detection of the 3D shape of an object. For example, scanner 228 may be configured to detect the 3D shape using any suitable technique, for example, light coding, stereo imaging, time-of-flight, etc. In some embodiments, scanner 228 may be configured as a 3D camera with a light pattern transmitter (e.g., using infrared light). Scanner 228 may be a component of user device 102 or may be a standalone device communicatively coupled to user device 102.

I/O devices 220 may include input device 229. Input device 229 may include at least one of a touchpad, a touch screen, a keyboard, a mouse, a button, a dial, a knob, a switch, a fingerprint scanner, an ultrasonic scanner, or the like. As will be appreciated by one of skill in the art, input device 229 may be any device capable of receiving user inputs to perform or assist in performing methods consistent with disclosed embodiments. For example, input device 229 may be configured to assist in the performance of authentication processes by receiving passcodes.

Referring again to FIG. 2, user device 102 includes memory 230 including one or more memory units. Memory 230 may be a volatile or non-volatile, magnetic, semiconductor, optical, removable, non-removable, or other type of storage device or tangible (i.e., non-transitory) computer-readable medium. Memory 230 may store one or more programs (e.g., modules, code, scripts, or functions) used to perform methods consistent with disclosed embodiments. Programs may include operating systems (not shown) that perform known operating system functions when executed by one or more processors. Disclosed embodiments may operate and function with computer systems running any type of operating system. Programs stored in memory 230 may be written in one or more programming or scripting languages. One or more of such software sections or modules of memory 230 can be integrated into a computer system, non-transitory computer-readable media, or existing communications software. The programs can also be implemented or replicated as firmware or circuit logic.

Memory 230 may include programs (e.g., modules, code, scripts, algorithms), to authenticate a user, create or edit a user profile, authenticate a user, record voice data, analyze voice data, capture image data, record video data, perform voice recognition, perform facial recognition, detect finger prints, send and receive data, display a message, play a message, generate haptic feedback, store data, and/or other functions consistent with disclosed embodiments. Memory 230 includes at least one of encrypted data or unencrypted data.

As shown in FIG. 2, memory 230 may include an authentication module 232 and a communications module 234.

In some embodiments, authentication module 232 includes instructions that, when executed by processor 210, cause processor 210 to perform operations to authenticate a user, consistent with disclosed embodiments. For example, authentication module 232 may be configured to confirm the identity of a user. Authentication module 232 is configured to receive authentication inputs and may be further configured to validate the authentication inputs. Authentication module 232 is configured to receive inputs from and send outputs to I/O devices 220 and to send data to and receive data from other modules of memory 232, including communication module 234. In some embodiments, authentication module 232 is configured to send and receive data via a network, such as network 112.

In some embodiments, authentication data are stored in authentication module 232. Authentication data may include, for example, user profile data, biometric data, fingerprint data, passcode data, voice recognition data, image data, or other authentication data. In some embodiments, authentication data are stored in one or more remote databases, not depicted, and authentication module 232 includes programs and scripts to receive authentication data from the remote database. In some embodiments, the remote databases may be components of authentication system 108.

Referring again to FIG. 2, memory 230 may include communication module 234. Communication module includes protocols and communication standards to open and maintain connections via transceiver 224. Communication module 234 may include functions to connect to a cellular data network, a Wi-Fi network, a Bluetooth device, a Li-Fi network, an optical wireless network, a Near Field Communication (NFC) network, or other wireless connection. In some embodiments, communication module 234 include functions to connect to a device using at least one of a Universal Serial Bus (USB) connection, a Firewire connection, an ethernet connection, or another cable connection. Communication module 234 may include programs and scripts to connect with, for example, network 112 and/or client device 104. For example, communication module 234 may be configured to scan and detect a client device, and connect to the detected client device (e.g., via Bluetooth, Li-Fi, Wi-Fi, NFC, or the like). Communication module 234 is configured to send and receive data via a network, such as network 112, and is configured to send and receive data to other modules of user device 102, including, for example, authentication module 232.

Figure 3:
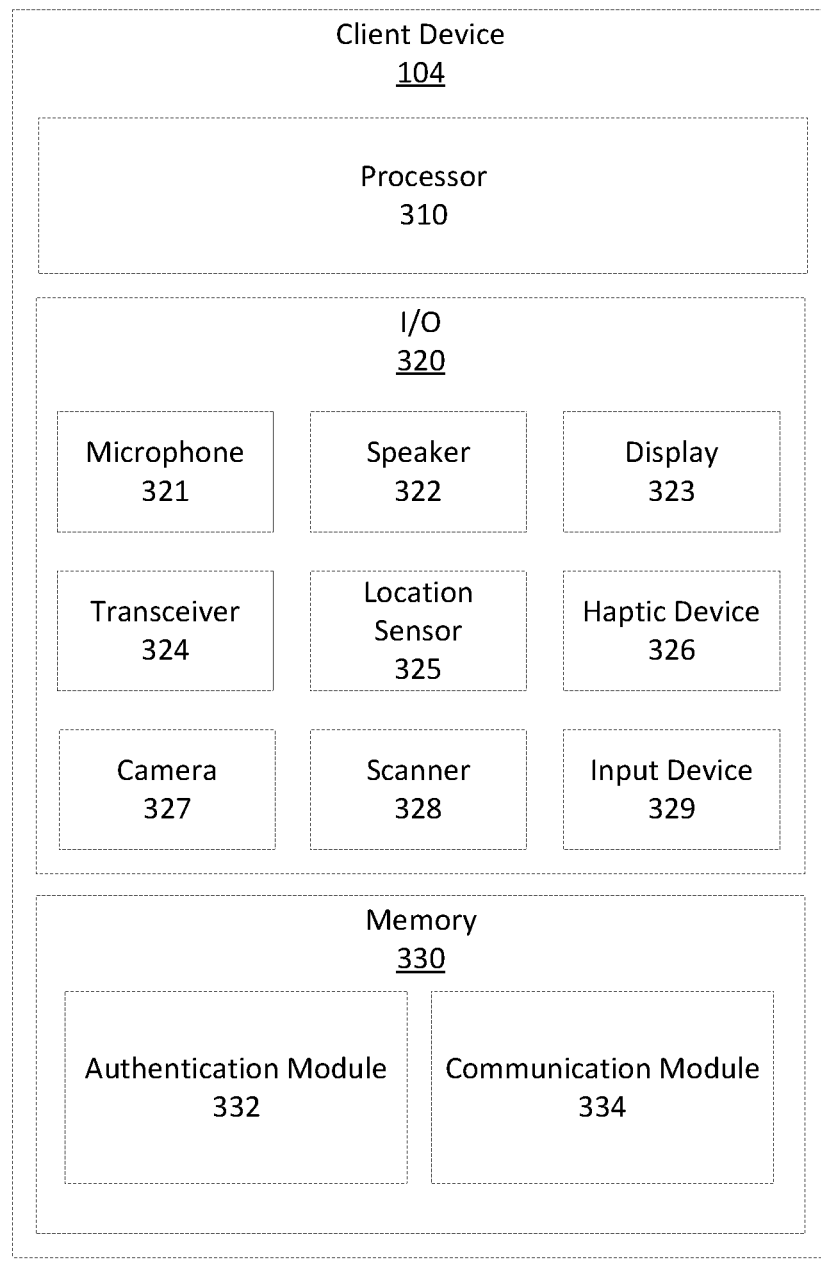
FIG. 3 is a diagram of an exemplary client device, consistent with disclosed embodiments.

FIG. 3 is a diagram of exemplary client device 104, consistent with disclosed embodiments. Client device 104 may be a terminal, a kiosk, a sensor, a security system component, a computer, a mobile device, a tablet, a smart watch, a wearable, a transaction device, a point of sale device, an Automated Teller Machine, a personal electronic assistant (e.g., ALEXA by AMAZON, GOOGLE HOME, SIRI by APPLE, MICROSOFT CORTANA), a robotic device, or other device.

As depicted in FIG. 3, client device 104 may include one or more processors 310, input/output units (I/O devices) 320, and one or more memory units 330. Processors 310 may be known computing processors as described above.

FIG. 3 is an exemplary configuration of client device 104. As will be appreciated by one skilled in the art, the components and arrangement of components included in client device 104 may vary. For example, as compared to the depiction in FIG. 3, client device 104 may include a larger or smaller number of processors 310, I/O devices 320, or memory units 330. In addition, client device 104 may further include other components or devices not depicted that perform or assist in the performance of one or more processes consistent with the disclosed embodiments. The components and arrangements shown in FIG. 3 are not intended to limit the disclosed embodiments, as the components used to implement the disclosed processes and features may vary.

Referring again to FIG. 3, I/O devices 320 may include a microphone 321, a speaker 322, a display 323, a transceiver 324, a location sensor 325, a haptic device 326, a camera 327, a scanner 328, and/or an input device 329. I/O devices 320 may include other I/O devices, not depicted, that perform or assist in the performance of one or more processes consistent with disclosed embodiments. I/O devices 320 may include features described in reference to I/O devices 220, above. In some embodiments, some or all of I/O devices 320 may be mounted to client device 104. In some embodiments, some or all of I/O devices 320 may be components of stand-alone devices communicatively coupled to client device 104.

Referring again to FIG. 3, client device 104 includes memory 330 including one or more memory units, as described above. Memory 330 may include programs (e.g., modules, code, scripts, algorithms), to authenticate a user, create or edit a user profile, authenticate a user, record voice data, analyze voice data, capture image data, record video data, perform voice recognition, perform facial recognition, detect finger prints, send and receive data, display a message or notification, play a message or notification, generate haptic feedback, store data, and/or other functions consistent with disclosed embodiments. Memory 330 includes at least one of encrypted data or unencrypted data.

As shown in FIG. 3, memory 330 may include an authentication module 332 and a communications module 334. In some embodiments, authentication module 332 includes instructions that, when executed by processor 310, cause processor 310 to perform operations to authenticate a user, consistent with disclosed embodiments. For example, authentication module 332 may be configured to confirm the identity of a user. Authentication module 332 is configured to receive authentication inputs and may be further configured to validate the authentication inputs. Authentication module 332 is configured to receive inputs from and send outputs to I/O devices 320 and to send data to and receive data from other modules of memory 332, including communication module 334. In some embodiments, authentication module 332 is configured to send and receive data via a network, such as network 112.

In some embodiments, authentication data are stored in authentication module 332. Authentication data may include, for example, user profile data, biometric data, passcode data, voice recognition data, image data, or other authentication data. In some embodiments, authentication data are stored in one or more remote databases, not depicted, and authentication module 332 includes programs and scripts to receive authentication data from the remote database. In some embodiments, the remote databases may be components of authentication system 108.

Referring again to FIG. 3, memory 330 may include communication module 334. Communication module includes protocols and communication standards to open and maintain connections via transceiver 324. Communication module 334 may include functions to connect to a cellular data network, a Wi-Fi network, a Bluetooth device, a Li-Fi network, an optical wireless network, a Near Field Communication (NFC) network, or other wireless connection. In some embodiments, communication module 334 include functions to connect to a device using at least one of a Universal Serial Bus (USB) connection, a Firewire connection, an ethernet connection, or another cable connection. Communication module 334 may include programs and scripts to connect with, for example, network 112 and/or user device 102. For example, communication module 334 may be configured to scan and detect a user device, and connect to the detected user device (e.g., via Bluetooth, Li-Fi, Wi-Fi, NFC, or the like). Communication module 334 is configured to send and receive data via a network, such as network 112, and is configured to send and receive data to other modules of client device 104, including, for example, authentication module 332.

Figure 4:
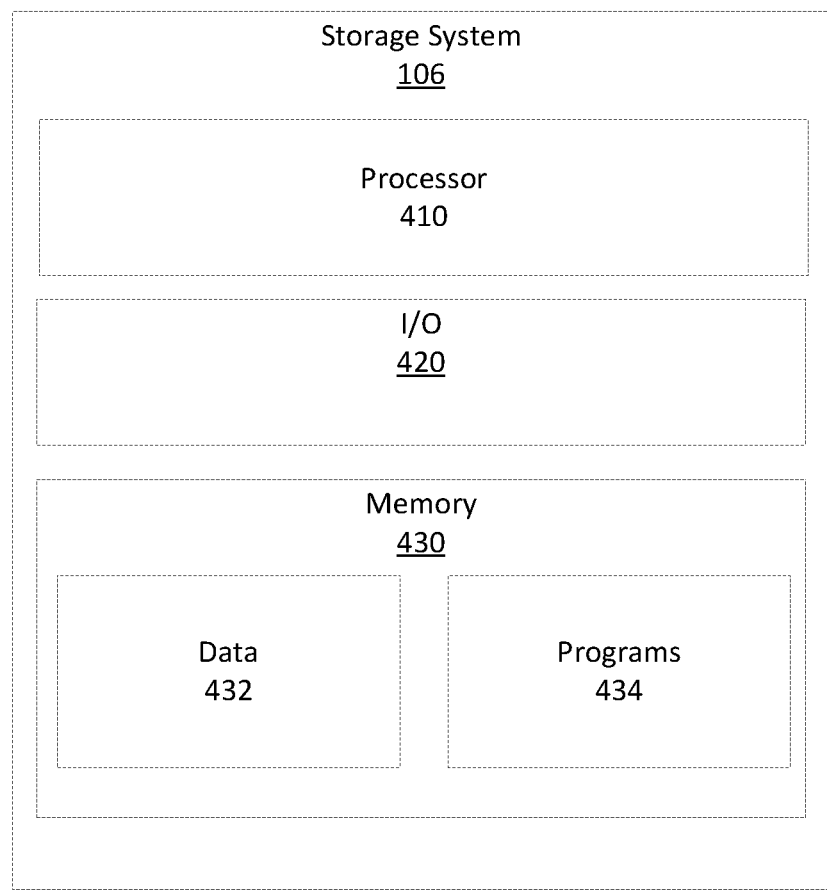
FIG. 4 is a diagram of an exemplary storage system, consistent with disclosed embodiments.

FIG. 4 is a diagram of exemplary storage system 106, consistent with disclosed embodiments. As shown, storage system 106 includes one or more processors 410, one or more I/O device 420, one or more memory units 430. In some embodiments, some or all components of storage system 106 may be hosted on a device, a computer, a server, a cluster of servers, or a cloud service (e.g., GOOGLE FIREBASE, AMAZON S3, GOOGLE CLOUD SPANNER, ORACLE CLOUD STORAGE CLASSIC, MICROSOFT AZURE BLOB STORAGE, IBM CLOUD OBJECT STORAGE, VMWARE CLOUD, SAP CLOUD PLATFORM, a private cloud, or the like). In some embodiments, storage system 106 is a scalable system configured to efficiently manage resources and enhance security by provisioning computing resources in response to triggering events and terminating resources after completing a task (e.g., a scalable cloud service that spins up and terminates container instances).

In some embodiments not shown, storage system 106 may be a component of authentication system 108. Storage system 106 may be connected to network 112 and may additionally be connected to authentication system 108.

Processors 410 may include one or more known computing processors, as described above. One of ordinary skill in the art would understand that other types of processor arrangements could be implemented that provide for the capabilities disclosed herein. The disclosed embodiments are not limited to any type of processor(s) configured in storage system 106. Processor 410 may execute various instructions stored in memory 430 to perform various functions of the disclosed embodiments described in greater detail below. Processor 410 is configured to execute functions written in one or more programming languages.

I/O devices 420 may include components to connect to network 112 and to send data to and receive data from other components of system 100 (e.g., via a transceiver). I/O devices 420 may include at least one of a display, an LED, a router, a touchscreen, a keyboard, a microphone, a speaker, a haptic device, a camera, a button, a dial, a switch, a knob, a transceiver, or another I/O device to perform methods of the disclosed embodiments.

Still referring to FIG. 4, storage system 106 includes memory 430 including one or more memory units, as described above. One or more software sections or modules of memory 430 can be integrated into a computer system, non-transitory computer-readable media, or existing communications software. The programs, modules, or code can also be implemented or replicated as firmware or circuit logic.

As shown, memory 430 may include data 432 and programs 434. In some embodiments, data 432 includes one or more databases comprising an organized or structured collection of tables, queries, objects, schema, reports, views, or the like. Data 432 may include stored data associated with a user or a user profile.

Programs 434 may include programs (e.g., modules, code, scripts, or functions) to process received data. For example, programs 434 may be configured to convert files from one format to another format. For example, the conversion may be between .aac, .wav, .mp3, wav, MIDI files, RIFF files, etc. and/or may include conversion to a predetermined bit depth (e.g., 16 bit pulse-code modulation (PCM)). Programs 434 may be configured to perform a task in response to a triggering event. For example, in response to a triggering event such as the receipt of input data from one component of system 100 (e.g., from user device 102), programs 434 may be configured to process the input data and forward processed data to another system component (e.g., to authentication system 108). Programs 434 may be configured to generate (spin-up) an ephemeral container instance to perform one or more tasks (e.g., a FIREBASE instance, a CONNECTIVITY instance, a GOOGLE CLOUD instance, and/or an AZURE instance). Programs 434 may be configured to assign a task to a previously generated container instance (i.e., a warm container instance). Programs 434 may include programs for processing audio files, processing biometric data, or processing other authentication data. Programs 434 may include an Application Programming Interface (API).

Figure 5:
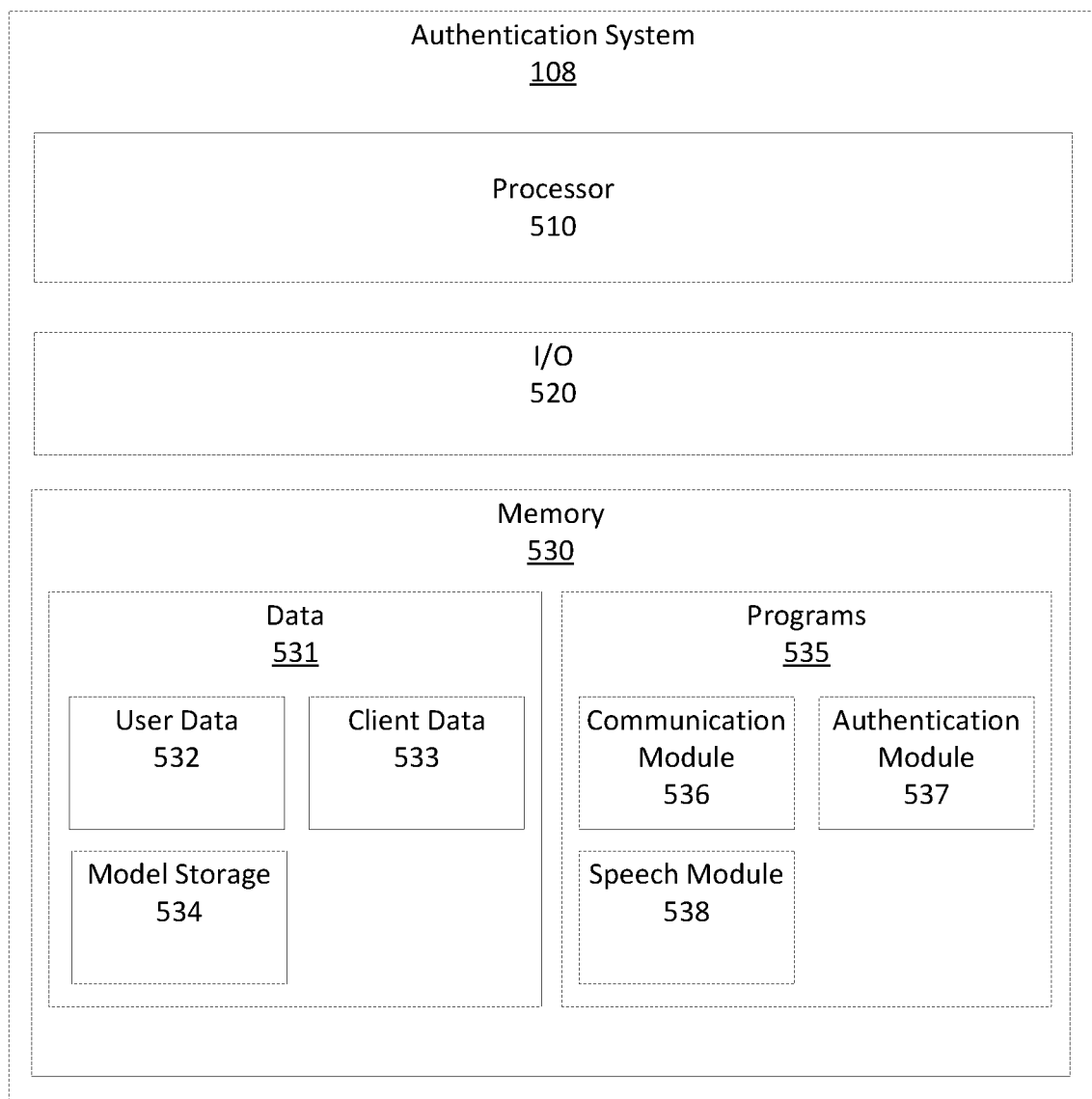
FIG. 5 is a diagram of an exemplary authentication system, consistent with disclosed embodiments.

FIG. 5 is a diagram of exemplary authentication system 108, consistent with disclosed embodiments. As shown, authentication system 108 includes one or more processors 510, one or more I/O device 520, one or more memory units 530. In some embodiments, some or all components of authentication system 108 may be hosted on one or more devices, one or more computers, one or more servers, one or more cluster of servers, or one or more cloud services (e.g., MICROSOFT AZURE, AMAZON AWS LAMBDA, MICROSOFT COGNITIVE SERVICES, ORACLE CLOUD, GOOGLE CLOUD FUNCTIONS, APACHE OPENWHISK, VMWARE, SAP CLOUD PLATFORM, SALESFORCE CLOUD, or the like). In some embodiments, authentication system 108 is a scalable system configured to efficiently manage resources and enhance security by provisioning computing resources in response to triggering events and terminating resources after completing a task (e.g., a scalable cloud service that spins up and terminates container instances). Authentication system 108 may be connected to network 112 and may additionally be connected to storage system 106 and/or third-party system 110.

Processors 510 may include one or more known computing processors, as described above. One of ordinary skill in the art would understand that other types of processor arrangements could be implemented that provide for the capabilities disclosed herein. The disclosed embodiments are not limited to any type of processor(s) configured in authentication system 108. Processor 510 may execute various instructions stored in memory 530 to perform various functions of the disclosed embodiments described in greater detail below. Processor 510 is configured to execute functions written in one or more programming languages.

I/O devices 520 may include components to connect to network 112 and to send data to and receive data from other components of system 100 (e.g., via a transceiver). I/O devices 520 may include at least one of a display, an LED, a router, a touchscreen, a keyboard, a microphone, a speaker, a haptic device, a camera, a button, a dial, a switch, a knob, a transceiver, or another I/O device to perform methods of the disclosed embodiments.

Still referring to FIG. 5, authentication system 108 includes memory 530 including one or more memory units, as described above. One or more software sections or modules of memory 530 can be integrated into a computer system, non-transitory computer-readable media, or existing communications software. The programs, modules, or code can also be implemented or replicated as firmware or circuit logic. As shown, memory 530 may include data 531 and programs 535. In some embodiments, data 531 includes one or more databases comprising an organized or structured collection of tables, queries, objects, schema, reports, views, or the like. Data 531 may include stored user data 532, client data 532, and model storage 534.

User data 532 may comprise user profile data including at least one of demographic user data (e.g., name, address, date of birth, sex), a personal identifier (e.g., a social security number, a driver's license number), a username, a password, information identifying a registered user device, a user activity history (i.e., a log), financial data (e.g., transaction history, account information), or third-party data associated with a user (e.g., medical data, administrative data, property data, tax data, financial data, or the like). User data 532 may be organized into a plurality of user profiles comprising user data associated with respective users.

As shown, memory 530 may include client data 533. Client data 533 may comprise data associated with a user (e.g., as disclosed above related to user data 532) or data associated with a client. The client may be an organization (e.g., a hospital, a merchant, a corporation, a bank, a website, an online retailer, a school, a government organization, a non-profit, or the like). For example, client data 533 may include data related to a history of actions associated with the client (e.g., a transaction history).

Model storage 534 may include a plurality of data models capable of performing one or more tasks, consistent with disclosed embodiments. For example, model storage 534 may include machine learning models, generative adversarial network models, random forest models, recurrent neural network models, convolutional neural network (CNN) models, deep learning models, conversational models, supervised models, hidden Markov models, self-learning models, discriminative learning models, Bayesian learning models, structured sequence learning models, adaptive learning models, statistical models or other data models. Models may be trained to perform tasks and stored in model storage 534. For examples, models stored in model storage 534 may be capable of voice recognition in an audio signal, or capable of facial recognition, or of executing another authentication process. Model storage 534 may include an index comprising information about stored models, including model performance metrics, version history, or other information. As will be understood by one of skill in the art, model storage 534 may comprise still other data to perform disclosed methods of the embodiments.

Programs 535 may include programs (e.g., modules, code, scripts, or functions) to perform methods consistent with disclosed embodiments. For example, programs 535 may be configured to generate models, retrieve models from model storage, train models, and/or send and receive data to and from other components of system 100. Programs 535 may be configured to perform a task in response to a triggering event. For example, in response to a triggering event such as the receipt of data from one component of system 100 (e.g., from storage system 106), programs 535 may be configured to process the data (e.g., execute a voice recognition process) and transmit notification to another system component (e.g., to at least one of user device 102 or client device 104). Programs 535 may be configured to generate (spin-up) an ephemeral container instance to perform one or more tasks (e.g., an AZURE container instance, a LAMBDA instance, a FIREBASE instance, an encryption service instance, or other instance). Programs 535 may be configured to assign a task to a previously generated container instance (i.e., a warm container instance). Programs 535 may include one or more APIs, and each APIs may be associated with one or more modules of programs 535.

As shown, programs 535 includes a communication module 536, an authentication module 537, and a speech module 538. Communication module 536 includes protocols and communication standards to open and maintain connections to other components of system 100 and connections between the various components of authentication service 108. Communication module 536 may include functions to connect to a cellular data network, a Wi-Fi network, a Bluetooth device, a Li-Fi network, an optical wireless network, a Near Field Communication (NFC) network, or other wireless connection. In some embodiments, communication module 535 include functions to connect to a device using at least one of a Universal Serial Bus (USB) connection, a Firewire connection, an Ethernet connection, or another cable connection.

Communication module 536 may include programs and scripts to connect with, for example, network 112, storage system 106, and/or third-party system 110. Communication module 536 is configured to send and receive data via a network, such as network 112, and is configured to send and receive data to other modules of authentication system 108. Components of communication module 536 may be stored on one or more devices, computers, servers, server clusters, or cloud services. Communication module 536 may be configured to generate (spin-up) an ephemeral container instance to perform one or more tasks, or to assign task to a running (warm) container instance.

Authentication module 537 is configured to perform an authentication process. For example, authentication module 537 may include programs to validate received authentication data with authentication data retrieved from data 531. Authentication module 537 may be configured to retrieve data from user data 532, from client data 533, from model storage 534, and/or from other components of data 531. Authentication module 537 may include algorithms for verifying biometrics, facial recognition, voice recognition, speech recognition, or other authentication algorithms. Authentication module 537 may be configured to run image processing models to perform classification tasks, recognition tasks, or other tasks. Authentication module 537 may be configured for data encryption, data decryption, tokenization, or other security protocols. Components of authentication module 537 may be stored on one or more devices, computers, servers, server clusters, or cloud services. Authentication module 538 may be configured to generate (spin-up) an ephemeral container instance to perform one or more tasks, or to assign task to a running (warm) container instance.

Authentication module 537 may be configured to generate a model to execute tasks, consistent with disclosed embodiments. The model may be a machine learning model or other data model. Authentication module 537 may be configured to retrieve and execute models stored in a model storage, such as model storage 534.

Authentication module 537 may be configured to train models and/or perform hyperparameter tuning. For example, authentication module 537 may be configured to optimize one or more model parameters and optimize one or more hyperparameters. The model parameter may be a model weight, a coefficient, offset, or the like. Hyperparameters can include training parameters such as learning rate, batch size, or the like, or architectural parameters such as number of layers in a neural network, the choice of activation function for a neural network node, the layers in a convolutional neural network or the like. To train a model, authentication module 537 may be configured to perform processes such as a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like.

Speech module 538 includes programs for voice and speech recognition processes. Components of speech module 538 may be stored on one or more devices, computers, servers, server clusters, or cloud services. Speech module 538 may be a component of authentication module 537 or may be a separate module stored on the same or different device, computer, server, server cluster, or cloud services. For example, speech module 538 may be hosted on MICROSOFT COGNITIVE SERVICES. Speech module 538 may be configured to generate (spin-up) an ephemeral container instance to perform one or more tasks, or to assign task to a running (warm) container instance.

Speech module 538 includes voice recognition algorithms. Speech module 538 may include algorithms to convert speech to text, verify a voice, identify an unknown speaker, or and/or recognize a known speaker. Speech module 538 may be configured to recognize a passphrase or other phrase. Speech module 538 may be configured to generate a model to execute tasks, consistent with disclosed embodiments. The model may be a machine learning model or other data model. Speech module 538 may be configured to retrieve and execute models stored in a model storage, such as model storage 534. Speech module 538 may be configured to train models and/or perform hyperparameter tuning, as described above.

Figure 6:
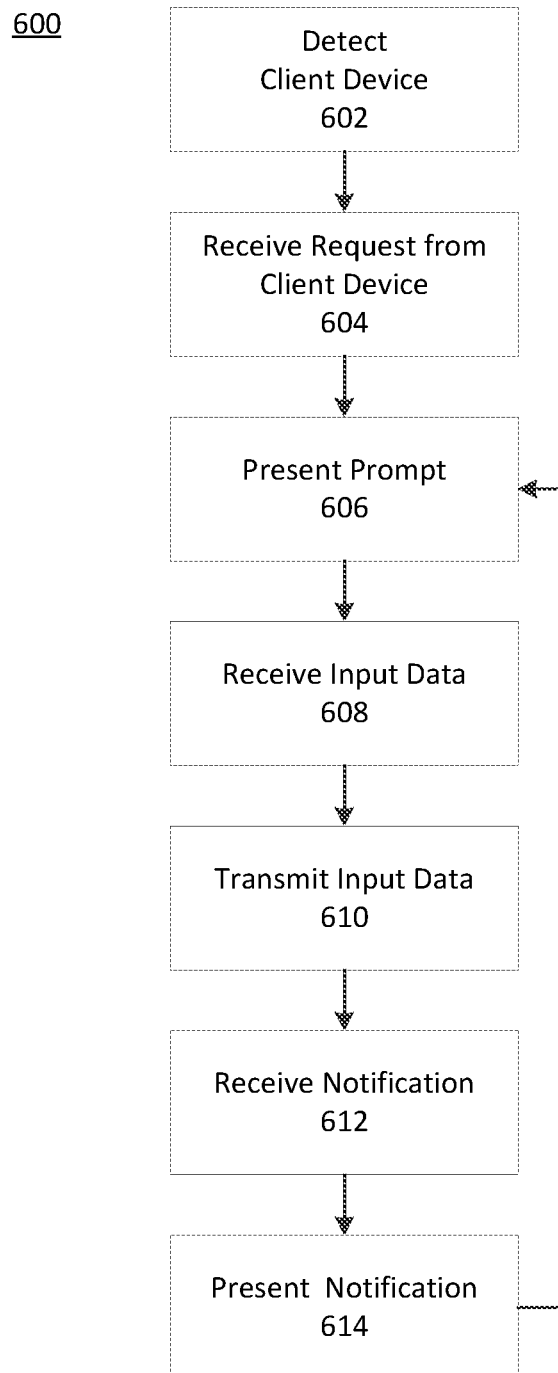
FIG. 6 is a flowchart of an exemplary process for contactless authentication, consistent with disclosed embodiments.

FIG. 6 is a flowchart of exemplary process 600 for contactless authentication, consistent with disclosed embodiments. In some embodiments, process 600 is performed by a user device, for example by user device 102. Process 600 may be performed to authenticate a user to grant access to a restricted area, to complete a transaction, to retrieve sensitive data, or to complete another authorization protocol, consistent with disclosed embodiments. For example, process 600 may include authorizing a user having user device 102 (e.g., a smart watch) via voice recognition to purchase an item (e.g., a food item) from a merchant having client device 104 (e.g., a tablet).

At step 602, a user device (e.g., user device 102) detects a client device (e.g., client device 104), consistent with disclosed embodiments. In some embodiments, detecting a client device includes scanning to detect the client device and establishing a connection to the client device. Detecting a client device may include at least one of scanning Bluetooth channels, Wi-Fi channels, Li-Fi channels, infrared channels, NFC channels, or other the like. Establishing connection may include connecting to the client device using at least one of a Bluetooth channel, a Wi-Fi channel, a Li-Fi channel, an infrared channel, an NFC channel, or the like. Step 602 may be performed by communication module 234.

At step 604, the user device receives a request from the client device, consistent with disclosed embodiments. The request may include a request to complete an authentication process. The request may include information related to at least one of the client device (e.g., an identifier or a client name), an access point (e.g., a security access point), a transaction (e.g., a sales price), a third-party, or other information.

At step 606, the user device presents a prompt to provide authentication data, consistent with disclosed embodiments. The prompt may be played by a speaker (e.g., speaker 222) and/or displayed on a display (e.g., display 223). The prompt may include a request to provide authentication data. The requested authentication data includes at least one of speech data (e.g., a request to state a passphrase or other phrase), a pin, a password, a tap pattern, or other authentication data.

At step 608, the user device receives input data, consistent with disclosed embodiments. The input data may be the requested authentication data. For example, the input data may be speech data comprising a user voice signal received at a microphone (e.g., input device 229).

At step 610, the user device transmits input data, consistent with disclosed embodiments. In some embodiments, transmitting the input comprising transmitting input from user device 102 to at least one of storage system 106 or authentication system 108.

At step 612, the user device receives a notification, consistent with disclosed embodiments. The notification may comprise information related to whether the authentication has been successfully completed or other information. In some embodiments, the notification is received from one of authentication system 108, client device 104, third-party system 110, or storage system 106.

At step 614, the user device presents the received notification, consistent with disclosed embodiments. The received notification may be played by a speaker (e.g., speaker 222) and/or displayed on a display (e.g., display 223).

As shown in FIG. 6, step 606 may follow step 614, consistent with disclosed embodiments. For example, if the notification included a statement that the authentication did not successfully complete or that additional information is needed, the user device may present a prompt to provide authentication data. In other embodiments, process 600 ends following step 614. For example, process 600 may end if the notification included a statement that the authentication completed successfully).

Figure 7:
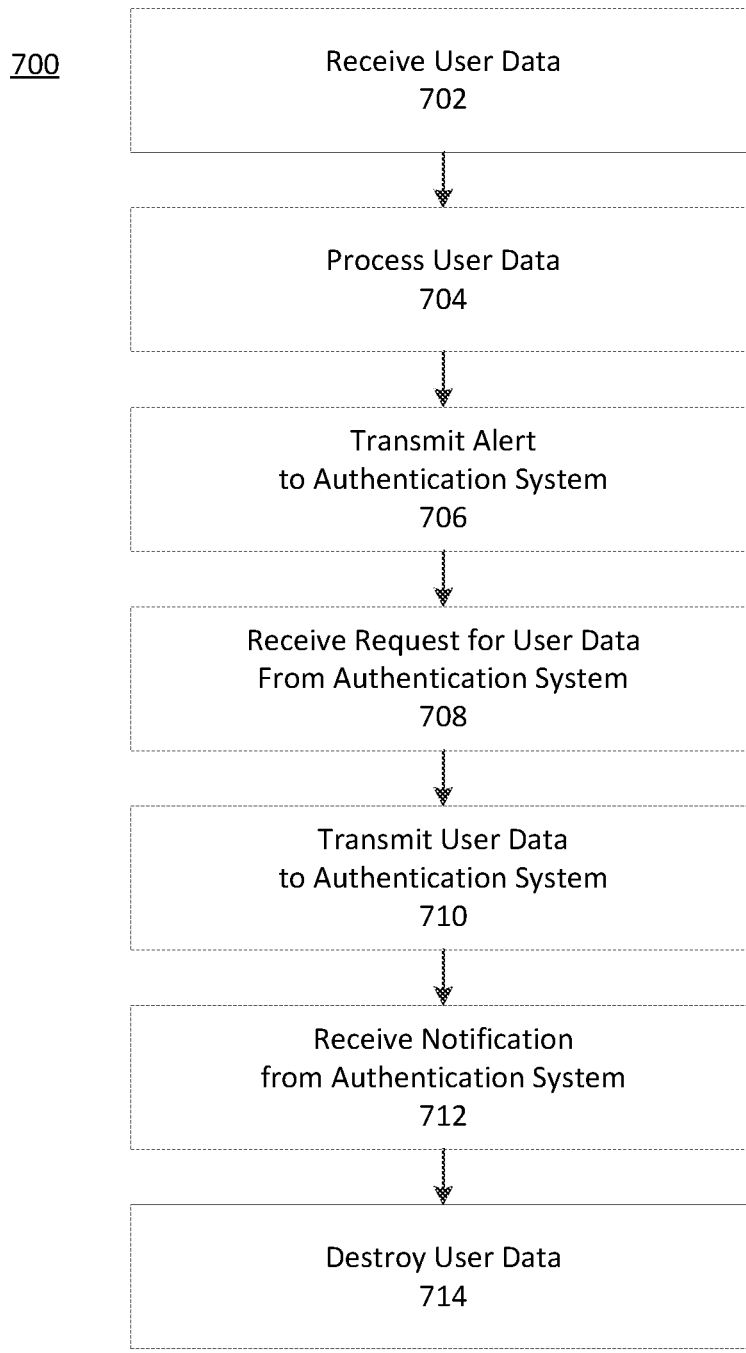
FIG. 7 is a flowchart of an exemplary storage system process, consistent with disclosed embodiments.

FIG. 7 is a flowchart of exemplary storage system process 700, consistent with disclosed embodiments. Process 700 may be performed to convert data from one format into another format, thereby allowing greater cross-platform compatibility between devices and components of system 100.

In some embodiments, process 700 is performed as part of a scalable, event-driven process to efficiently manage resources and enhance security by provisioning computing resources in response to triggering events and terminating resources after completing a task (e.g., a scalable cloud service that spins up and terminates container instances). Components of storage system 106 may perform process 700, consistent with disclosed embodiments. In some embodiments, components of authentication system 108 perform process 700 (e.g., if storage system 106 is a sub-component of authentication system 108).

At step 702, the storage system receives user data, consistent with disclosed embodiments. In some embodiments, step 702 is performed by components of storage system 106. Storage system 106 may receive this user data from at least one of user device 102 or client device 104. Step 702 may include spinning up (generating) an ephemeral container instance to perform subsequent steps of process 700.

The user data of step 702 may include audio data comprising voice data, user profile data comprising at least one of demographic user data (e.g., name, address, date of birth, sex), a personal identifier (e.g., a social security number, a driver's license number), a username, a password, information identifying a registered user device, a user activity history (e.g., a log), financial data (e.g., transaction history, account information), third-party data associated with a user (e.g., medical data, administrative data, property data, tax data, financial data, or the like), or other information. In some embodiments, the received user data further includes at least one of client data (e.g., an identifier, a client name), access point data (e.g., a security access point identifier), or transaction data (e.g., a sales price).

At step 704, the storage system generates processed user data based on the received user data, consistent with disclosed embodiments. For example, step 704 may include converting audio data from one data format into another data. For example, the conversion may be between .aac, .wav, .mp3, .wav, MIDI files, RIFF files, etc. and/or may include conversion to a predetermined bit depth (e.g., 16 bit pulse-code PCM). In some embodiments, step 704 includes other data processes, such as image processing, encryption, decryption, tokenization, or the like. Step 704 may be performed by one or more ephemeral container instances, consistent with disclosed embodiments.

At step 706, the storage system transmits an alert to an authentication system (e.g., authentication system 108), consistent with disclosed embodiments. The alert may comprise information that user data has been received. In some embodiments, the alert includes the received user data or the processed user data (e.g., user profile data and/or audio data). Step 706 may be performed by one or more ephemeral container instances, consistent with disclosed embodiments.

At step 708, the storage system receives a request from the authentication system (e.g., authentication system 108), consistent with disclosed embodiments. In some embodiments, step 708 is performed by components of storage system 106. The request may include a request to transmit the received user data and/or processed user data to the authentication system. Step 708 may be performed by one or more ephemeral container instances, consistent with disclosed embodiments.

At step 710, based on the request, the storage system transmits the user data to the authentication system (e.g., authentication system 108 or authentication module 232), consistent with disclosed embodiments. The transmitted user data may include the received user data and/or processed user data. Step 710 may be performed by one or more ephemeral container instances, consistent with disclosed embodiments.

At step 712, the storage system receives a notification from the authentication system (e.g., authentication system 108 or authentication module 232), consistent with disclosed embodiments. The notification may include a statement that the user data was received and/or instructions to destroy the user data. Step 712 may be performed by one or more ephemeral container instances, consistent with disclosed embodiments.

At step 714, the storage system destroys user data and/or processed audio data is destroyed, consistent with disclosed embodiments. Destroying user data may comprise permanently deleting user data and processed audio data. Destroying user data may include deleting file pointers associated with user data and processed audio. In some embodiments, permanently deleting sensitive file 104 wiping data by overwriting memory associated with user data, audio data, and processed audio data. Step 714 may be performed by one or more ephemeral container instances, consistent with disclosed embodiments. Step 714 may include terminating the ephemeral container instance.

Figure 8:
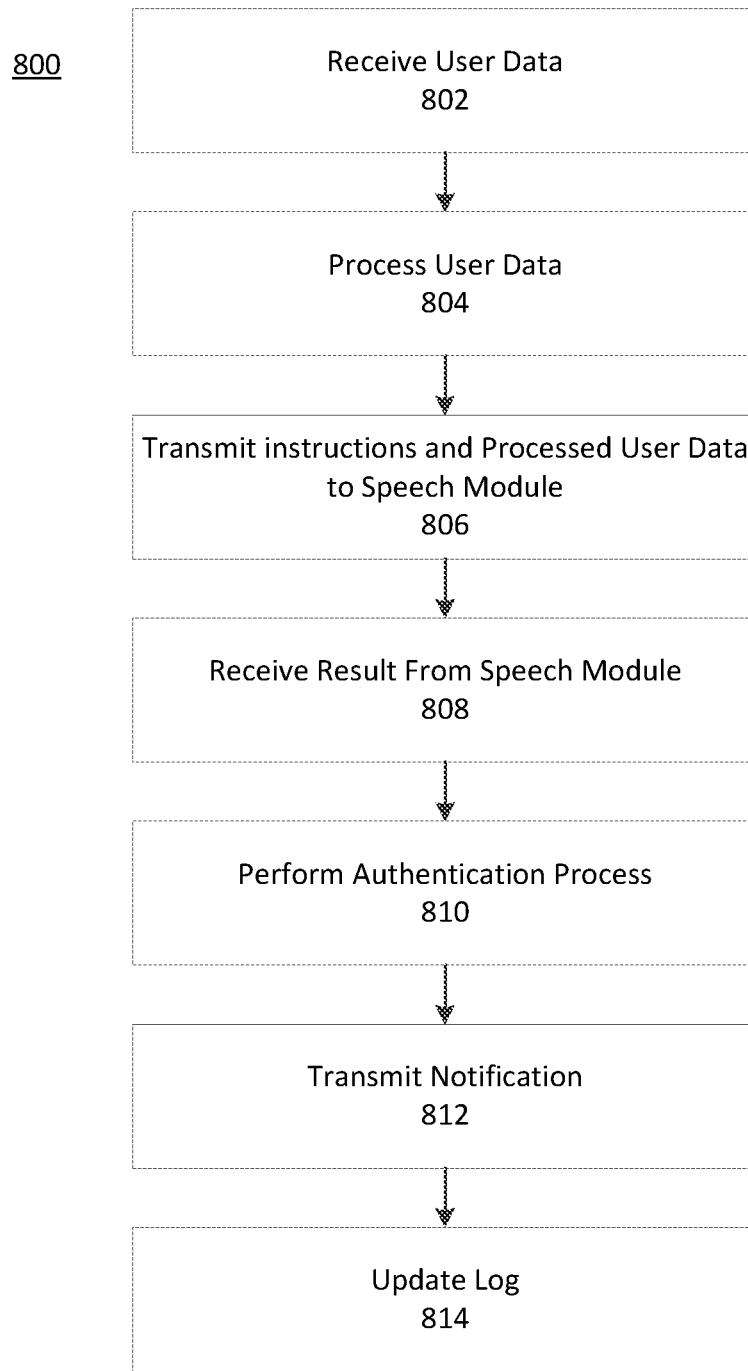
FIG. 8 is a flowchart of an exemplary authentication system process, consistent with disclosed embodiments.

FIG. 8 is a flowchart of exemplary authentication system process 800, consistent with disclosed embodiments. Process 800 may be performed to authenticate received data as part of a contactless authorization process (e.g., user data from user device 102, data from client device 104). Steps of process 800 may be performed by an authentication system (e.g., authentication system 108) hosted on one or more devices, one or more computers, one or more servers, or one or more cloud service platforms. In some embodiments, process 800 is performed as part of a scalable, event-driven process to efficiently manage resources and enhance security by provisioning computing resources in response to triggering events and terminating resources after completing a task (e.g., a scalable cloud service that spins up and terminates container instances).

At step 802, the authentication system receives user data, consistent with disclosed embodiments. For example, authentication module 537 may receive the user data from another component of system 100 (e.g., from one of user device 102, client device 104, or storage system 106). The user data includes audio data. In some embodiments, the audio data is audio data transmitted directly from user device 102 or client device 104. In some embodiments the audio data is processed audio data received from storage system 106. The processed audio data may have a different data format than an originally recorded audio data. The user data may include audio data comprising voice data, user profile data comprising at least one of demographic user data (e.g., name, address, date of birth, sex), a personal identifier (e.g., a social security number, a driver's license number), a username, a password, information identifying a registered user device, a user activity history (i.e., a log), financial data (e.g., transaction history, account information), third-party data associated with a user (e.g., medical data, administrative data, property data, tax data, financial data, or the like), or other information. In some embodiments, the received user data further includes at least one of client data (e.g., an identifier, a client name), access point data (e.g., a security access point identifier), or transaction data (e.g., a sales price). Step 802 may include spinning up an ephemeral container instance in response to receiving the data, the container instance being hosted by the authentication system, consistent with disclosed embodiments.

At step 804, the authentication system processes the user data, consistent with disclosed embodiments. In some embodiments, processing the user data includes converting audio data from one data format into another data format. For example, the conversion may be between .aac, .wav, .mp3, .wav, MIDI files, RIFF files, etc. and/or may include conversion to a predetermined bit depth (e.g., 16 bit PCM). . Processing the user data may include image processing, facial recognition processes, validating biometric data, encryption or decryption processes, or other data processes. In some embodiments, processing user data includes identifying a user profile based on the received user data. For example, identifying the user profile may include retrieving a user profile from a data storage (e.g., user data 532, a database, or the like) based on at least one of a username, a password, or an identifier. In some embodiments, processing the user data comprises identifying a client device based on the received user data. For example, identifying the client device may include retrieving information from client data 533 based on a received client device identifier. Step 804 may be performed by one or more ephemeral container instances, consistent with disclosed embodiments.

At step 806, the authentication system transmits instructions and the processed user data to a speech module (e.g., speech module 538), consistent with disclosed embodiments. Step 806 may be performed by one or more ephemeral container instances, consistent with disclosed embodiments. The instructions may include commands to perform a voice recognition process. The instructions may include commands to convert speech to text, verify a voice, identify an unknown speaker, or and/or recognize a known speaker. The instructions may include a command to match a received voice signal to a user. The instructions may include commands to use a stored model (e.g., to use a model stored in model storage 534). The instructions may include data comprising a reference voice signal. The reference voice signal may be associated with a user profile. The instructions may include a command for the speech module to generate an ephemeral container instance to execute a task, the task comprising voice recognition.

At step 808, the authentication system receives a match result from the speech module, consistent with disclosed embodiments. For example, in response to the instructions, the speech module may apply a speech model to the input audio data to determine a user identify and return a match result stating the outcome of the determination. The match result may further comprise information identifying a speech component. For example, the match result may identify a stored key phrase associated with a user. The match result may indicate that a user was not identified.

At step 810, the authentication system performs an authentication process, consistent with disclosed embodiments. The authentication process may include comparing the received data to log data. The authentication process may include authenticating a user based on the match result. The authentication process may be a multi-factor authentication that is based on the match result and further based on additional authentication criteria. The additional authentication criteria may include at least one of a password, a pass code, a tap code; a fingerprint scan; a code received in response to a notification comprising the code (e.g., receiving the code after texting or emailing the code to an account associated with a user); a biometric; an indication that a facial recognition process has been successful; or other authentication criteria. Step 810 may be performed by one or more ephemeral container instances, consistent with disclosed embodiments.

At step 812, the authentication system transmits a notification to at least one of the user device (e.g., user device 102) or the client device (e.g., client device 104), consistent with disclosed embodiments. The notification may state the outcome of the authentication process. The notification may include information pertaining to the client device or a third-party. Step 812 may be performed by one or more ephemeral container instances, consistent with disclosed embodiments.

At step 814, the authentication system updates a log, consistent with disclosed embodiments. For example, the log may be updated to record the time that the request was received, whether the authentication was successful, the location of stored data associated with process 800, or other information. The log may be stored in, for example, one of user data 532 or client data 533. Step 814 may be performed by one or more ephemeral container instances, consistent with disclosed embodiments.

Any of the steps of process 800 may include terminating an ephemeral container instance that performed a respective step.

Figure 9:
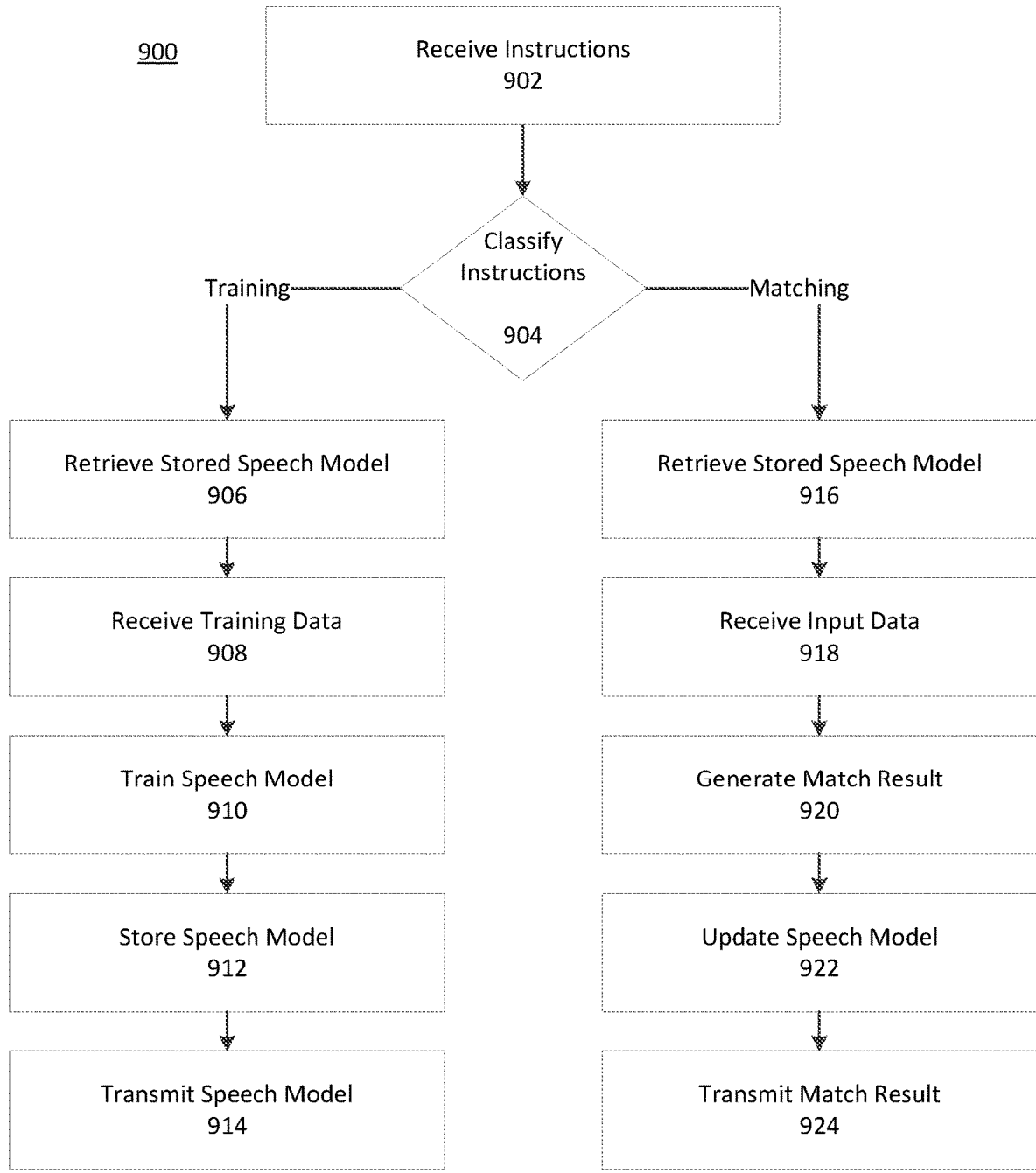
FIG. 9 is a flowchart of an exemplary voice recognition process, consistent with disclosed embodiments.

FIG. 9 is a flowchart of exemplary voice authentication process 900, consistent with disclosed embodiments. Process 900 may be performed to convert speech to text, verify a voice, identify an unknown speaker, or and/or recognize a known speaker. In some embodiments, process 900 is performed by speech module 538 as part of a scalable, event-driven process to efficiently manage resources and enhance security by provisioning computing resources in response to triggering events and terminating resources after completing a task (e.g., a scalable cloud service that spins up and terminates container instances).

At step 902, a speech module receives instructions (e.g., at speech module 538), consistent with disclosed embodiments. Step 902 may be performed by one or more ephemeral container instances, consistent with disclosed embodiments. The instructions may include commands to perform a voice recognition process. The instructions may include commands to train a speech model. The instructions may include commands to convert speech to text, verify a voice, identify an unknown speaker, or and/or recognize a known speaker. The instructions may include a command to match a received voice signal to a user. The instructions may include commands to use a stored model (e.g., to use a model stored in model storage 534). The instructions may include data comprising a reference voice signal. The reference voice signal may be associated with a user profile. The instructions may include a command for the speech module to generate an ephemeral container instance to execute a task, the task comprising voice recognition.

At step 904, the speech module classifies the instructions, consistent with disclosed embodiments. For example, the instructions may be classified as training instructions to train a speech model or matching instructions to match a received voice signal to a user. As shown in FIG. 9, if the instructions are classified as training instructions steps 906 to 914 may be performed, and steps 916 to 924 may be skipped. Alternatively, as shown, if the instructions are classified as matching instructions, steps 916 to 924 may be performed and steps 906 to 914 may be skipped. Step 904 may be performed by one or more ephemeral container instances, consistent with disclosed embodiments.

At step 906, the speech module retrieves a stored speech model, consistent with disclosed embodiments. For example, a stored model may be retrieved from a model storage (e.g., model storage 534) based on user information and/or based on the received instructions. In some embodiments, step 906 includes generating a new speech model. The speech model may include at least one of a machine learning model, a generative adversarial network model, a random forest model, a recurrent neural network model, a convolutional neural network (CNN) model, a deep learning model a conversational model, a supervised model, a hidden Markov model, a self-learning model, a discriminative learning model, a Bayesian learning model, a structured sequence learning model, an adaptive learning model, a statistical model, or another data model. Step 906 may be performed by one or more ephemeral container instances, consistent with disclosed embodiments.

At step 908, the speech module receives training data. The training data may include one or more audio signals comprising speech. The training data may include speech associated with a user and speech associated with other individuals. The training data may include metadata labelling the speaker, labeling audio data that contains a passphrase, or other metadata. Step 902 may be performed by one or more ephemeral container instances, consistent with disclosed embodiments.

At step 910, the speech module trains the speech model, consistent with disclosed embodiments. Step 910 may include hyperparameter tuning. For example, training may include optimizing a model parameter and one or more hyperparameters. The model parameter may be a model weight, a coefficient, offset, or the like. Hyperparameters can include training parameters such as learning rate, batch size, or the like, or architectural parameters such as number of layers in a neural network, the choice of activation function for a neural network node, the layers in a convolutional neural network or the like. To train a model, authentication module 537 may be configured to perform processes such as a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like. Step 910 may include determining a performance metric (e.g., an accuracy score) of the speech model. Step 910 may be performed one or more ephemeral container instance, consistent with disclosed embodiments.

At step 912, the speech model is stored in a model storage (e.g., model storage 534), consistent with disclosed embodiments. Step 912 may include updating a model index by recording one or more model characteristics (e.g., a performance metric). Step 912 may be performed by one or more ephemeral container instances, consistent with disclosed embodiments.

At step 914, the speech model is transmitted to another component of system 100, consistent with disclosed embodiments. For example, the speech model may be transmitted for use locally at one or more of user device 102 or client device 104. Step 914 may be performed by one or more ephemeral container instances, consistent with disclosed embodiments.

Referring again to step 904, if the received instructions are classified as matching instructions, in step 916 the speech module may retrieve a stored speech model, consistent with disclosed embodiments. For example, a stored model may be retrieved from a model storage (e.g., model storage 534) based on user information. Retrieving the stored speech model at step 916 may further include retrieving user data based on the instructions, the user data including one or reference audio data, consistent with disclosed embodiments. The stored speech model may be a speech model identified in the matching instructions. Step 916 may be performed by one or more ephemeral container instances, consistent with disclosed embodiments.

At step 918, the speech module receives input data, the input data comprising audio data, consistent with disclosed embodiments. For example, input data may be received from at least one of user device 102, client device 104, or storage system 106. In some embodiments, the input data is processed audio data received from storage system 106. The audio data of step 918 includes voice data. The input data may include other user data (e.g., user profile data) or metadata. Step 918 may be performed by one or more ephemeral container instances, consistent with disclosed embodiments.

At step 920, the speech module generates a match result based on the input data and the speech model, consistent with disclosed embodiments. For example, speech module 538 may apply the speech model to the input audio data to determine a user identify. The determination may be based on reference audio data associated with a user. The match result may further comprise information identifying a speech component. For example, the match result may comprise identifying, in the input audio data, a stored key phrase associated with a user. Step 920 may be performed by one or more ephemeral container instances, consistent with disclosed embodiments.

At step 922, the speech module may update the speech model, consistent with disclosed embodiments. For example, if a match is confirmed at step 920, the speech module may train the speech model based on the confirmed match, consistent with disclosed embodiments (e.g., by optimizing model parameters); in this way, the speech model may engage in machine learning and account for model drift or data drift over time (e.g., as a user's voice changes due to age, temporary illness, different levels of tiredness, etc.). Step 922 may be performed by one or more ephemeral container instances, consistent with disclosed embodiments.

At step 924, the speech module may transmit the match result to another component of system 100, consistent with disclosed embodiments. For example, the match result may be transmitted from speech module 538 to at least one of authentication module 537, user device 102, client device 104, or third-party system 110. Step 924 may be performed by one or more ephemeral container instances, consistent with disclosed embodiments.

Figure 10:
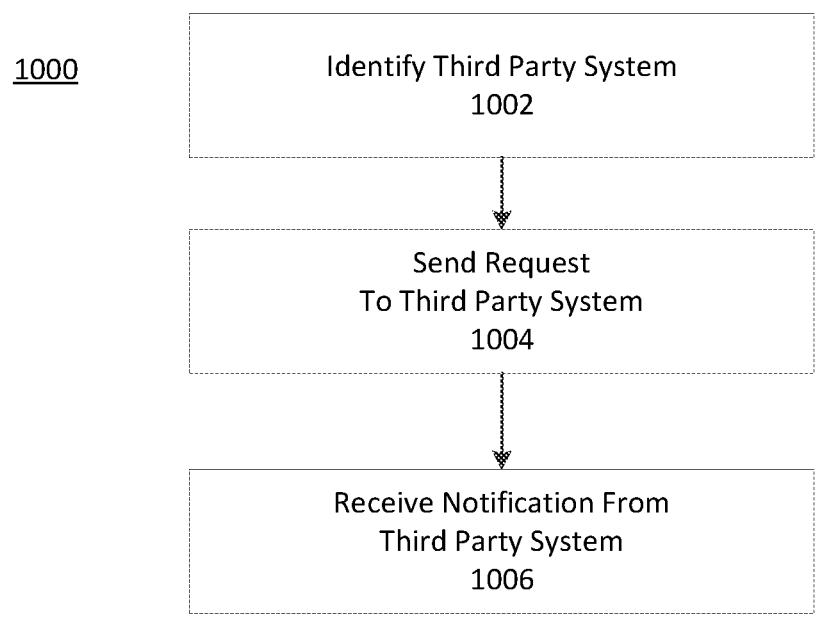
FIG. 10 is a flowchart of an exemplary process for processing a third-party system request, consistent with disclosed embodiments.

FIG. 10 is a flowchart of exemplary process 1000 for processing a third-party system request, consistent with disclosed embodiments. Process 1000 may be performed by one of user device 102, client device 104, storage system 106, or authentication system 108. For example, third-party system 110 may be a financial institution, and process 1000 may be performed by authentication system 108 to process a transaction and send payment form an account identified by user device 102 to an account identified by client device 104. As one of skill in the art will appreciate, this example is for illustration only and is not limiting to embodiments of process 1000.

At step 1002, the performing device identifies a third-party system, consistent with disclosed embodiments. The system may be identified at least based on one of user data associated with user device 102 or client data associated with client device 104. Step 1002 may be performed by one or more ephemeral container instances, consistent with disclosed embodiments.

At step 1004, the performing device sends a request to the third-party system, consistent with disclosed embodiments. The request may include authentication data, the result of an authentication, consistent with disclosed embodiments. The request may include a request to send information (e.g., a record) to at least one of user device 102, client device 104, or authentication system 108. For example, the request may include a request to send a notification stating whether a payment was successful.

At step 1006, the performing device receives a notification from the third-party system in response to the request, consistent with disclosed embodiments. In some embodiments, the notification may state whether a payment was successful. Step 1006 may be performed by one or more ephemeral container instances, consistent with disclosed embodiments.

Figure 11:
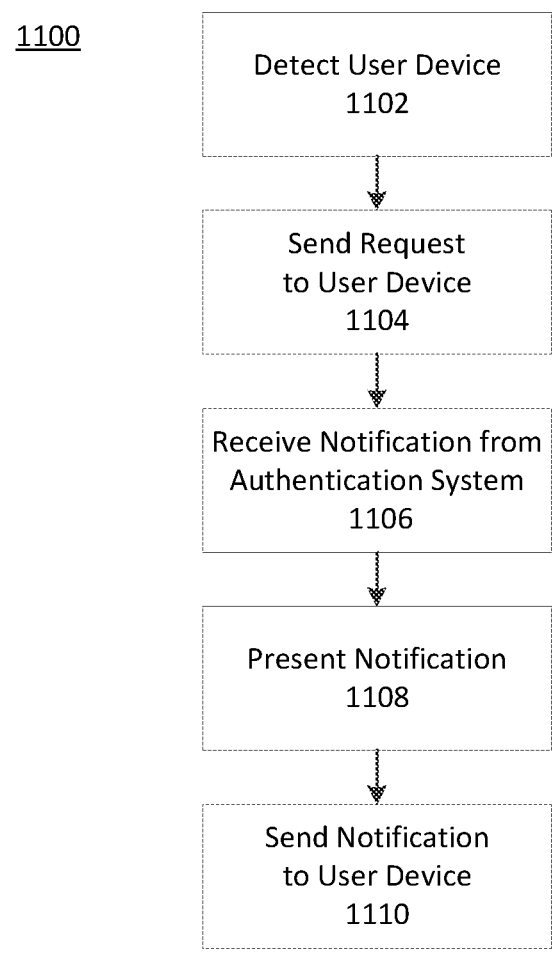
FIG. 11 is a flowchart of an exemplary process for connecting to a user device, consistent with disclosed embodiments.

FIG. 11 is a flowchart of exemplary process 1100 for connecting to a user device, consistent with disclosed embodiments. Process 1100 may be performed by, for example, client device 104.

At step 1102, a client device (e.g., client device 104) detects a user device (e.g., user device 102), consistent with disclosed embodiments. In some embodiments, detecting a user device includes scanning to detect the user device and establishing a connection to the user device. Detecting a client device may include at least one of scanning Bluetooth channels, Wi-Fi channels, Li-Fi channels, infrared channels, NFC channels, or other the like. Establishing connection may include connecting to the client device using at least one of a Bluetooth channel, a Wi-Fi channel, a Li-Fi channel, an infrared channel, an NFC channel, or the like. In some embodiments, step 1102 may be performed by communication module 324.

At step 1104, the client device sends a request to the user device, consistent with disclosed embodiments. The request may include information related to an account, a transaction, an access point, an event, a vehicle, or the like. The request may include a client device identifier and/or a client account identifier. The request may include a request to complete an authentication process.

At step 1106, the client device receives a notification from an authentication system, consistent with disclosed embodiments. The notification may state whether a user associated with the user device successfully completed an authentication process. The notification may state other information related to the request, including, for example, whether a payment was successful.

At step 1108, the client device presents the notification, consistent with disclosed embodiments. In some embodiments, presenting the notification includes playing an audio signal over a speaker (e.g., speaker 322) or displaying the notification on a display (e.g., display 323).

At step 1110, the client device sends a notification to the user device, consistent with disclosed embodiments. Sending the notification may include sending the received notification (step 1106). Sending the notification may further include sending additional information (e.g., sending a record or log of an activity, such as a payment receipt).

Figure 12:
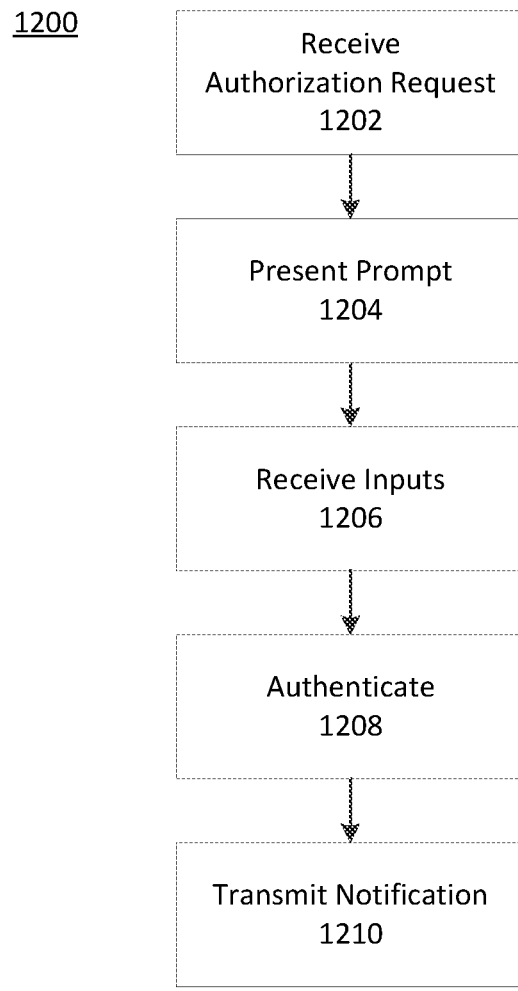
FIG. 12 is a flowchart of an exemplary process for authenticating a user, consistent with disclosed embodiments.

FIG. 12 is a flowchart of exemplary process 1200 for authenticating a user, consistent with disclosed embodiments. Process 1200 occurs at one of user device 102 or client device 104 (e.g., by one of authentication module 232 or authentication module 234). Process 1200 may be a sub-process of process 600 or process 1100. Process 1200 may occur, for example, as part of a multi-factor authentication process initiated by a remote system component (e.g. by authentication system 108 or third-party system 110).

At step 1202, an authentication module receives an authentication request, consistent with disclosed embodiments. For example, user device 102 may receive an authentication request from one of third-party system 110, client device 104, or authentication system 108. As another example, client device 104 may receive an authentication request from one of third-party system 110, user device 102, or authentication system 108. The request may include a temporary code or other authentication data. In some embodiments, the authentication request is generated and received locally at one of user device 102 or client device 104 and is not received from another system component.

At step 1204, the authentication module displays a prompt comprising the authentication request, consistent with disclosed embodiments. Presenting the prompt may include at least one of playing an audio signal (e.g., via speaker 222 or speaker 322) or displaying the prompt (e.g., using display 223 or display 323).

At step 1206, the authentication module receives authentication input data, consistent with disclosed embodiments. The authentication input data may include a voice signal received at, for example, one of microphone 221 or microphone 321. The authentication input data may further include a password, a passcode, or a tap code; a fingerprint scan; a biometric; an indication that a facial recognition process has been successful; or other authentication input data.

At step 1208, the authentication module performs an authentication process, producing an authentication result, consistent with disclosed embodiments. The authentication process may include verifying authentication input data locally on one of user device 102 or client device 104. For example, the authentication process may include performing a voice recognition process using a speech model stored locally on one of user device 102 or client device 104. The authentication process may include transmitting, to authentication system 108, the authentication input data and/or other data and receiving an authentication result from authentication system 108. The authentication input data may include a temporary code or other authentication data received at step 1202.

At step 1210, the authentication module transmits a notification, consistent with disclosed embodiments. For example, the notification may be transmitted from one of user device 102 and client device 104 to the other of user device 102 and client device 104. The notification may be transmitted from one of user device 102 and client device 104 to another component of system 100 (e.g., authentication system 108 or third-party system 110).

Figure 13:
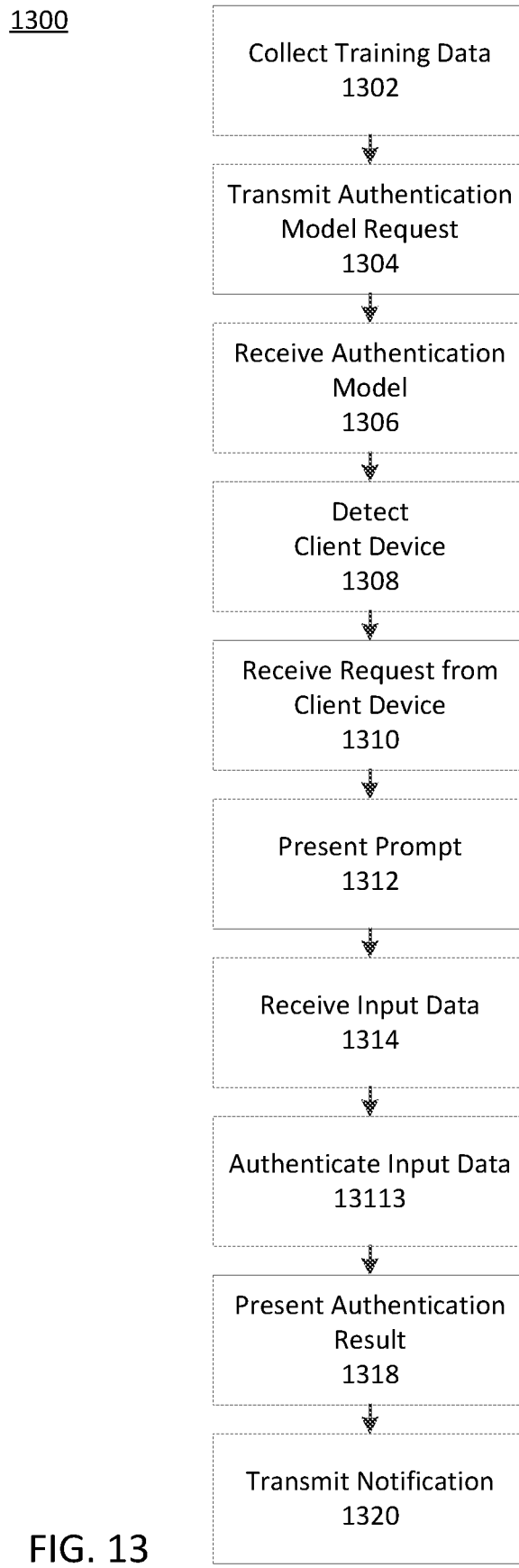
FIG. 13 is a flowchart of an exemplary process for authenticating a user, consistent with disclosed embodiments.

FIG. 13 is a flowchart of exemplary process 1300 for authenticating a user, consistent with disclosed embodiments. Process 1300 is performed at a user device (e.g., user device 102).

At step 1302, a user device collects training data are collected, consistent with disclosed embodiments. The training data may include collecting one or more audio signals comprising speech (e.g., via microphone 221). The training data may include speech associated with a user and reference speech associated with other individuals. The training data may include metadata labelling the speaker, labeling audio data that contains a passphrase, or other metadata.

At step 1304, the user device transmits an authentication model request to an authentication system (e.g., authentication system 108), consistent with disclosed embodiments. The model request may include the training data.

At step 1306, the user device receives an authentication model from the authentication system and stores the model, consistent with disclosed embodiments. The authentication model may include a speech model trained by the authentication system, consistent with disclosed embodiments. The speech model may be configured to execute voice recognition algorithms. The model may be capable of converting speech to text, verifying a voice, identifying an unknown speaker, or and/or recognizing a known speaker. The authentication model may include a machine learning model, a generative adversarial network model, a random forest model, a recurrent neural network model, a convolutional neural network model, a deep learning model, a statistical model, or another data model. Storing the authentication model at the user device at step 1306 may include storing the authentication model in authentication module 232.

At step 1308, the user device detects a client device (e.g., client device 604), consistent with disclosed embodiments. In some embodiments, detecting a client device includes scanning to detect the client device and establishing a connection to the client device. Detecting a client device may include at least one of scanning Bluetooth channels, Wi-Fi channels, Li-Fi channels, infrared channels, NFC channels, or other the like. Establishing connection may include connecting to the client device using at least one of a Bluetooth channel, a Wi-Fi channel, a Li-Fi channel, an infrared channel, an NFC channel, or the like. Step 1308 may be performed by communication module 234.

At step 1310, the user device receives a request from the client device, consistent with disclosed embodiments. The request may include a request to complete an authentication process. The request may include information related to at least one of the client device (e.g., an identifier or a client name), an access point (e.g., a security access point), a transaction (e.g., a sales price), a third-party, or other information.

At step 1312, the user device presents a prompt to provide authentication data, consistent with disclosed embodiments. The prompt may be played by a speaker (e.g., speaker 222) and/or displayed on a display (e.g., display 223). The prompt may include a request to provide authentication data. The requested authentication data includes speech data (e.g., a request to state a passphrase or other phrase). The requested authentication data may further include a pin, a password, a tap pattern, or other authentication data.

At step 1314, the user device receives input data, consistent with disclosed embodiments. The input data may be the requested authentication data.

At step 1316, the user device authenticates the input data by the user device, consistent with disclosed embodiments. Authenticating the input data includes applying the authentication model to the input data to produce an authentication result. Step 1316 may be performed by authentication module 234.

At step 1318, the user device presents the authentication result, consistent with disclosed embodiments. Presenting the authentication result may include playing an audio signal (e.g., via speaker 222) or displaying the result on a display (e.g., via display 223).

At step 1320, the user device transmits a notification, consistent with disclosed embodiments. The notification may state the authentication result. The user device may transmit the notification to at least one of client device 104, authentication system 108, or third-party system 110.

Systems and methods disclosed herein involve unconventional improvements over conventional authentication systems. As compared to conventional technologies, the disclosed embodiments may improve security, convenience, and cross-platform compatibility.

Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

Computer programs based on the written description and methods of this specification are within the skill of a software developer. The various functions, scripts, programs, or modules can be created using a variety of programming techniques. For example, programs, scripts, functions, program sections or program modules can be designed in or by means of languages, including JAVASCRIPT, C, C++, JAVA, PHP, PYTHON, RUBY, PERL, BASH, or other programming or scripting languages. One or more of such software sections or modules can be integrated into a computer system, non-transitory computer-readable media, or existing communications software. The programs, modules, or code can also be implemented or replicated as firmware or circuit logic.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. An authentication system comprising:
   at least one memory storing instructions; and
   one or more processors configured to execute the instructions to perform operations comprising:
   receiving a speech authentication model request from a user device of a user, the speech authentication model request comprising training data including audio data of the user having an original audio data format with an identifier and a training command to train a speech authentication model for deployment at the user device;
   receiving instructions for the training command, wherein the instructions comprise generate an ephemeral container instance to execute the training command;
   processing the audio data of the user by converting the audio data from the original audio data format into a different audio data format;
   based on the training command, training a speech authentication model, using the training data including the converted audio data comprising speech of the user and audio data labeled as containing a passphrase, to determine a match between a received voice signal and the processed audio data of the user when the speech authentication model is deployed at the user device, the passphrase being authentication data for contactless authentication by the user device;
   determining an accuracy of the trained speech authentication model; and
   transmitting the trained speech authentication model to the user device for deployment at the user device.

2. The authentication system of claim 1, wherein the speech authentication model is a stored speech authentication model previously trained to match voice signals.

3. The authentication system of claim 1, the operations further comprising generating the speech authentication model prior to training the trained speech model.

4. The authentication system of claim 1, the operations further comprising storing the speech authentication model.

5. The authentication system of claim 1, wherein the speech authentication model request is received at a storage system component of the authentication system, and the storage system component performs the processing of the audio data.

6. The authentication system of claim 5, the operations further comprising transmitting an alert from the storage system component to an authentication module of the authentication system, the alert comprising the processed audio data.

7. The authentication system of claim 6, the operations further comprising destroying processed audio data stored on the storage system component.

8. The authentication system of claim 1, the operations further comprising:
   receiving a matching request from the user device, the matching request comprising additional audio data;
   processing the additional audio data by converting the additional audio data into the different audio data format;
   generating a match result based on the processed additional audio data;
   updating the speech model based on the match result; and transmitting the match result to the user device.

9. The authentication system of claim 8, wherein transmitting the match result comprises transmitting the updated speech model.

10. The authentication system of claim 1, wherein processing the audio data is performed by an ephemeral container instance of the authentication system.

11. The authentication system of claim 1, wherein the speech authentication model comprises at least one of a recurrent neural network model, a hidden Markov model, a discriminative learning model, a Bayesian learning model, a structured sequence learning model, or an adaptive learning model.

12. The authentication system of claim 1, wherein the speech authentication model is a previously trained speech model associated with user data.

13. The authentication system of claim 1, wherein the authentication system comprises at least one scalable cloud service configured to generate and terminate container instances.

14. The authentication system of claim 1, wherein training the model comprises using training data comprising the processed audio data and audio data associated with a plurality of individuals.

15. The authentication system of claim 1, wherein training the model includes optimizing a model parameter and a hyperparameter.

16. The authentication system of claim 1, the operations further comprising storing the processed audio data as reference data associated with a user.

17. The authentication system of claim 1, wherein:
the operations include transmitting, from an authentication module of the authentication system to a speech module of the authentication system, instructions to train the speech authentication model, and
training the speech authentication model is performed by the speech module.

18. The authentication system of claim 1, wherein the speech authentication model comprises an algorithm to recognize speech of the user.

19. A computer-implemented method comprising:
receiving a speech authentication model request from a user device of a user, the speech authentication model request comprising training data including audio data of the user having an original audio data format with an identifier and a training command to train a speech authentication model for deployment at the user device;
receiving instructions for the training command, wherein the instructions comprise generate an ephemeral container instance to execute the training command;
processing the audio data of the user by converting the audio data from the original audio data format into a different audio data format;
based on the training command, training a speech authentication model, using the training data including the converted audio data comprising speech of the user and audio data labeled as containing a passphrase, to determine a match between a received voice signal and the processed audio data of the user when the speech authentication model is deployed at the user device, the passphrase being authentication data for contactless authentication by the user device;
determining an accuracy of the trained speech authentication model; and
transmitting the trained speech authentication model to the user device for deployment at the user device.

20. An authentication system comprising:
at least one memory storing instructions; and
one or more processors configured to execute the instructions to perform operations comprising:
receiving a speech authentication model request from a user device of a user, the speech authentication model request comprising training data including audio data of the user having an original audio data format with an identifier and a training command to train a speech authentication model for deployment at the user device;
receiving instructions for the training command, wherein the instructions comprise generate an ephemeral container instance to execute the training command;
processing the audio data of the user by converting the audio data from the original audio data format into a different audio data format;
retrieving a stored speech model associated with the user data;
based on the training command, training the stored speech authentication model, using the training data including the converted audio data comprising speech of the user and audio data labeled as containing a passphrase, the passphrase being authentication data for contactless authentication by the user device, to determine a match between a received voice signal and the processed audio data of the user when the speech authentication model is deployed at the user device, the training further comprising using training data comprising the processed audio data and audio data associated with a plurality of individuals;
storing the trained speech model and the processed audio data;
determining an accuracy of the trained speech authentication model; and
transmitting the trained speech authentication model to the user device for deployment at the user device.

* * * * *